United States Patent
Shigeta et al.

(10) Patent No.: US 10,564,827 B2
(45) Date of Patent: Feb. 18, 2020

(54) INFORMATION PROCESSING APPARATUS, INFORMATION PROCESSING METHOD, AND RECORDING MEDIUM

(71) Applicant: Sony Corporation, Tokyo (JP)

(72) Inventors: Osamu Shigeta, Tokyo (JP); Kazuyuki Yamamoto, Kanagawa (JP); Yasushi Okumura, Tokyo (JP); Yoshihito Ohki, Tokyo (JP); Takuo Ikeda, Tokyo (JP); Kenichi Okada, Kanagawa (JP); Junki Ohmura, Tokyo (JP); Michinari Kohno, Tokyo (JP); Naoki Saito, Chiba (JP)

(73) Assignee: Sony Corporation (JP)

( * ) Notice: Subject to any disclaimer, the term of this patent is extended or adjusted under 35 U.S.C. 154(b) by 751 days.

(21) Appl. No.: 14/362,273

(22) PCT Filed: Nov. 30, 2012

(86) PCT No.: PCT/JP2012/081103
§ 371 (c)(1),
(2) Date: Jun. 2, 2014

(87) PCT Pub. No.: WO2013/084821
PCT Pub. Date: Jun. 13, 2013

(65) Prior Publication Data
US 2014/0337807 A1    Nov. 13, 2014

(30) Foreign Application Priority Data

Dec. 9, 2011 (JP) .................................. 2011-270718
Nov. 27, 2012 (JP) .................................. 2012-258409

(51) Int. Cl.
G06F 3/0484 (2013.01)
G06F 3/01 (2006.01)
G06K 9/00 (2006.01)

(52) U.S. Cl.
CPC .......... *G06F 3/04845* (2013.01); *G06F 3/011* (2013.01); *G06F 3/017* (2013.01); *G06K 9/00355* (2013.01)

(58) Field of Classification Search
CPC ....... G06F 3/04845; G06F 3/011; G06F 3/017
(Continued)

(56) References Cited

U.S. PATENT DOCUMENTS 7,999,843 B2    8/2011  Ohba et al.
8,508,578 B2    8/2013  Ohba et al.
(Continued)

FOREIGN PATENT DOCUMENTS

JP    2005063225 A    3/2005
JP    2005-216061 A   8/2005
(Continued)

OTHER PUBLICATIONS

Japanese Office Action for Application No. 2012-258409 dated Mar. 22, 2016.
(Continued)

*Primary Examiner* — Angie Badawi
(74) *Attorney, Agent, or Firm* — Lerner, David, Littenberg, Krumholz & Mentlik, LLP

(57) ABSTRACT

There is provided an information processing apparatus including a processing unit configured to control combining of a captured image and an operation target image so as to generate a combined image for feeding back gesture recognition to a user. A degree of visualization of the captured image appears to be changed in the combined image.

10 Claims, 14 Drawing Sheets

(58) Field of Classification Search
USPC .......................................................... 715/863
See application file for complete search history.

(56) References Cited

U.S. PATENT DOCUMENTS

| | | | |
|---|---|---|---|
| 8,643,598 B2 | 2/2014 | Tsurumi et al. | |
| 2002/0044152 A1* | 4/2002 | Abbott, III | G06T 11/00 345/629 |
| 2007/0279485 A1* | 12/2007 | Ohba | G06F 3/012 348/41 |
| 2008/0075388 A1* | 3/2008 | Nishijima | G06K 9/00228 382/282 |
| 2009/0073117 A1* | 3/2009 | Tsurumi | G06F 3/005 345/158 |
| 2009/0252375 A1* | 10/2009 | Rekimoto | G06F 3/017 382/103 |
| 2009/0254855 A1 | 10/2009 | Kretz et al. | |
| 2013/0169537 A1 | 7/2013 | Tsurumi et al. | |

FOREIGN PATENT DOCUMENTS

| | | |
|---|---|---|
| JP | 2009-075685 A | 4/2009 |
| JP | 2009-089068 A | 4/2009 |
| JP | 2011-044061 A | 3/2011 |
| JP | 2011186730 A | 9/2011 |

OTHER PUBLICATIONS

Extended European Search Report for EP Application No. 12856323.6, dated Oct. 30, 2015.
International Search Report from International Publication PCT/JP2012/081103 dated Feb. 26, 2013.
Chinese Office Action for Application No. 201280058983.3 dated Jun. 12, 2016.
Japanese Office Action for Application No. 2012-258409 dated Aug. 2, 2016.

* cited by examiner

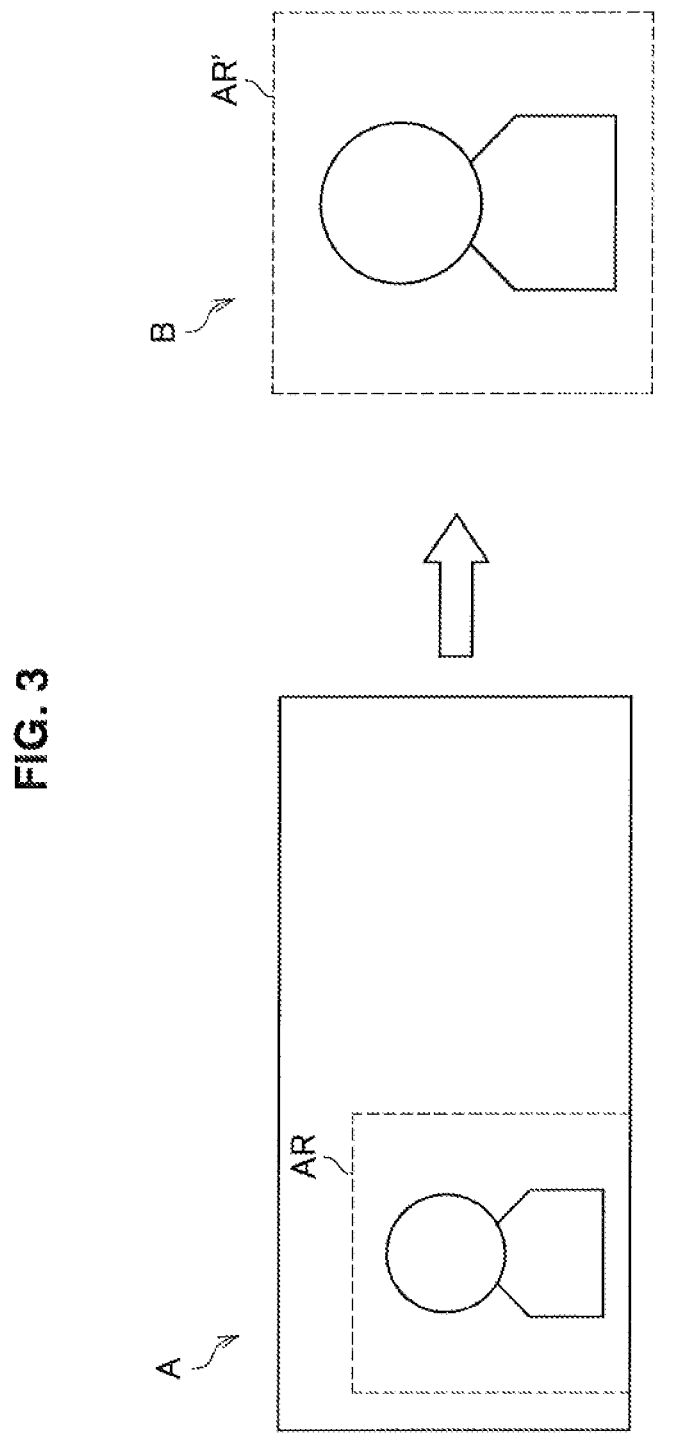

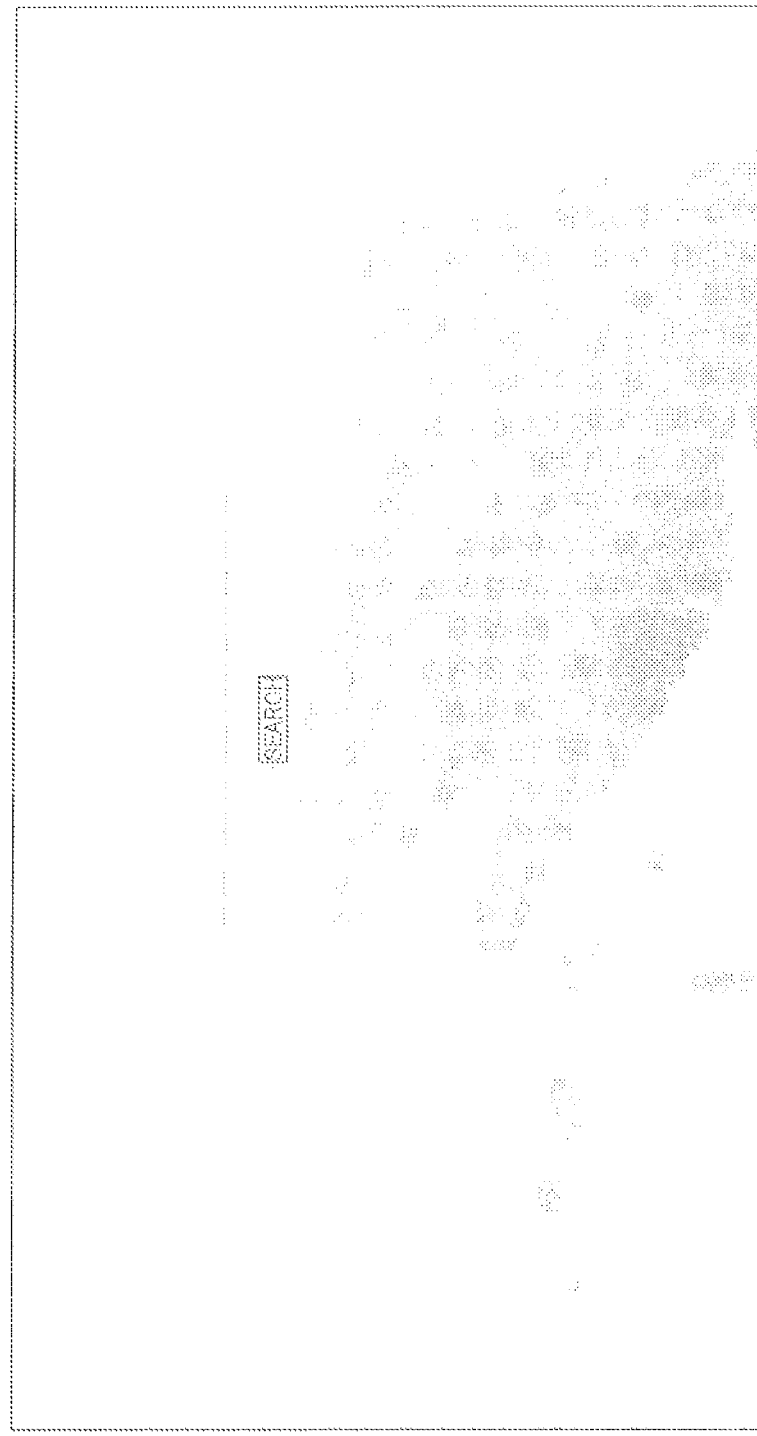

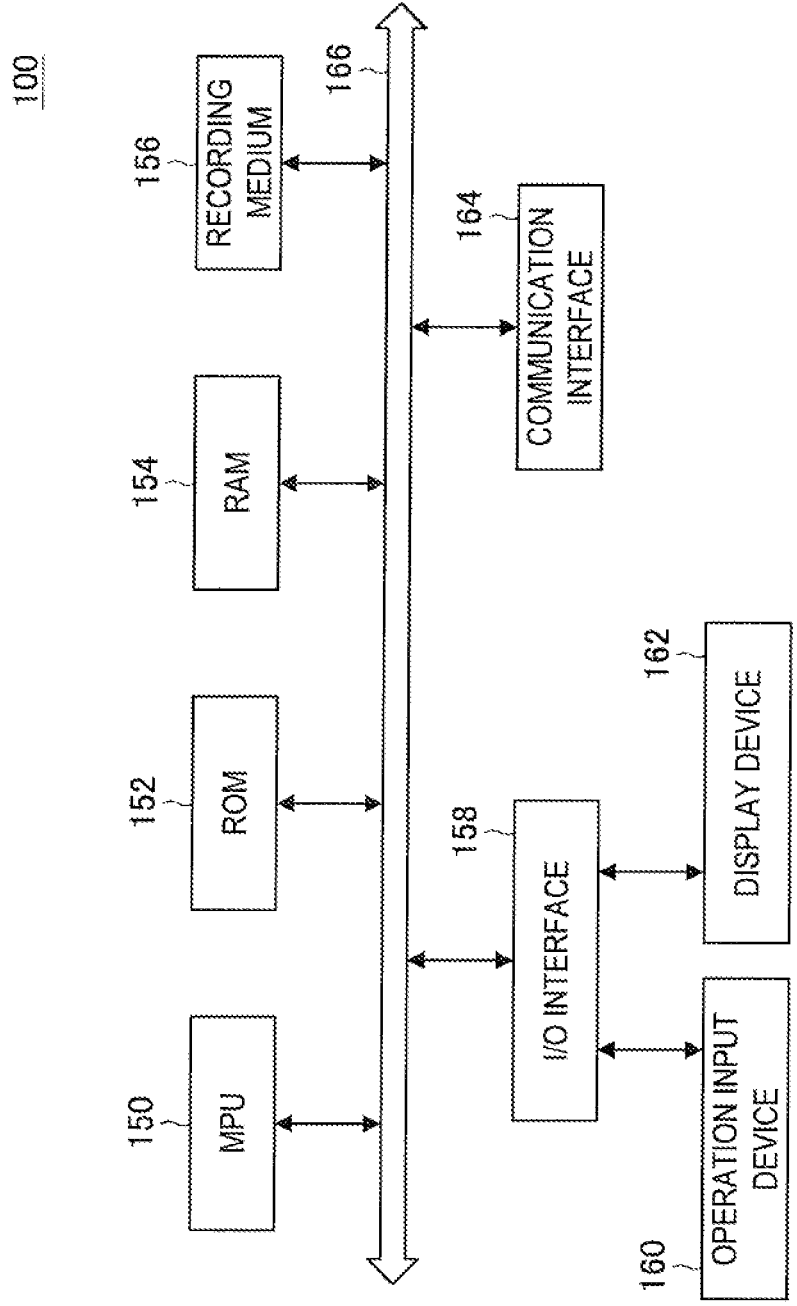

INFORMATION PROCESSING APPARATUS, INFORMATION PROCESSING METHOD, AND RECORDING MEDIUM

CROSS-REFERENCE TO RELATED APPLICATION

The present application is a national phase entry under 35 U.S.C. § 371 of International Application No. PCT/JP2012/081103 filed Nov. 30, 2012, published on Jun. 13, 2013 as WO 2013/084821 A1, which claims priority from Japanese Patent Application Nos. JP 2011-270718, filed in the Japanese Patent Office on Dec. 9, 2011, and JP 2012-258409, filed in the Japanese Patent Office on Nov. 27, 2012.

TECHNICAL FIELD

The present disclosure relates to an information processing apparatus, an information processing method, and a recording medium.

BACKGROUND ART

In recent years, high functionality and/or multi-functionality of apparatus such as electronic devices have been more advanced, and content of instructions that should be assigned to an apparatus to be used by a user has become more diversified and complicated. Under such circumstances, many apparatus adopt a graphical user interface (GUI) as a user interface. Accordingly, a user can assign an instruction to an apparatus more easily than in the case in which an apparatus adopting a character user interface (CUI) is used. However, for example, for users who are not familiar with an operation using a pointing device such as a mouse, the GUI to be operated using the pointing device is not necessarily a user-friendly user interface.

Under such circumstances, technology related to a user interface for improving operability is being developed. As technology for displaying an image obtained by combining a captured image with an object image related to an object associated with a predetermined event on a display screen, for example, there is technology disclosed in Patent Literature 1.

CITATION LIST

Patent Literature

Patent Literature 1: JP 2005-216061A

SUMMARY OF INVENTION

Technical Problem

For example, as in the case in which the technology disclosed in PTL 1 is used, a gesture operation of a user can be fed back to the user by displaying an image obtained by combining a captured image (or a mirror image based on the captured image: hereinafter referred to as the same) with an object image related to an object associated with a predetermined event on a display screen.

In addition, for example, the user using an apparatus to which the technology disclosed in PTL 1 has been applied can cause the apparatus to perform a process related to the predetermined event associated with the object by operating the object according to the gesture operation. Here, for example, in the technology disclosed in PTL 1, a position in which the object image is combined is changed according to the user's position detected from the captured image. Consequently, for example, the occurrence of a problem that it is difficult for the user to operate the object is likely to be reduced, for example, using the technology disclosed in PTL 1.

However, for example, the technology disclosed in PTL 1 changes the position in which the object image is combined according to the user's position detected from the captured image. Consequently, it is difficult to apply, for example, the technology disclosed in PTL 1 when an operation target image including an object serving as an operation target (hereinafter referred to as "operation target object") operable by the user such as a button or an icon, for example, as in a web page, is combined with the captured image.

Here, as a method of displaying a captured image for feeding back gesture recognition to the user and an operation target image on a display screen, for example, a method of combining the captured image with the operation target image to display a combined image on the display screen or a method of displaying each of the captured image and the operation target image as a separate image in one of division regions into which the display screen is divided is considered.

However, if the method of merely combining the captured image with the operation target image to display the combined image on the display screen is used, there is a problem in that visibility of an operation target object is degraded, for example, because content of the captured image is superimposed on the operation target object included in the operation target image. In addition, if the method of displaying each of the captured image and the operation target image as the separate image in one of the division regions into which the display screen is divided is used, there is a problem in that visibility of the operation target object included in the operation target image is degraded, for example, because a size or area of the division region in which the operation target image is displayed is less than that of the entire display screen.

The present disclosure proposes a novel and improved information processing apparatus, information processing method, and recording medium for enabling a captured image and an operation target image to be displayed on a display screen while preventing visibility of an operation target object from being degraded.

Solution to Problem

According to an embodiment of the present disclosure, there is provided an information processing apparatus including a processing unit configured to control combining of a captured image and an operation target image so as to generate a combined image for feeding back gesture recognition to a user. A degree of visualization of the captured image appears to be changed in the combined image.

According to an embodiment of the present disclosure, there is provided an information processing method including the step of combining a captured image with an operation target image so as to generate a combined image for feeding back gesture recognition to a user. A degree of visualization of the captured image appears to be changed in the combined image.

According to an embodiment of the present disclosure, there is provided a computer-readable recording medium recording a program for causing a computer to execute a step of combining a captured image with an operation target image so as to generate a combined image for feeding back gesture recognition to a user. A degree of visualization of the captured image appears to be changed in the combined image.

According to an embodiment of the present disclosure, there is provided an image processing apparatus including an image processing unit for changing a degree of visualization of a captured image, for feeding back gesture recognition to a user, to be displayed on a display screen, based on the captured image or an operation target image to be operated according to a result of the gesture recognition, and combining the captured image whose degree of visualization has been changed with the operation target image, and a display control unit for displaying a combined image on the display screen.

Further, according to an embodiment of the present disclosure, there is provided an image processing method including changing a degree of visualization of a captured image, for feeding back gesture recognition to a user, to be displayed on a display screen, based on the captured image or an operation target image to be operated according to a result of the gesture recognition, combining the captured image whose degree of visualization has been changed with the operation target image, and displaying a combined image on the display screen.

Advantageous Effects of Invention

According to the present disclosure, it is possible to display a captured image and an operation target image on a display screen while preventing visibility of an operation target object from being degraded.

BRIEF DESCRIPTION OF DRAWINGS

FIG. 3 is an explanatory diagram illustrating an example of a process of cropping a region including a user from a captured image in the image processing apparatus according to this embodiment.

FIG. 4B is an explanatory diagram illustrating an example of a combined image displayed by the image processing apparatus according to this embodiment on a display screen.

FIG. 14 is an explanatory diagram illustrating an example of a hardware configuration of the image processing apparatus according to this embodiment.

DESCRIPTION OF EMBODIMENTS

Figure 1A:
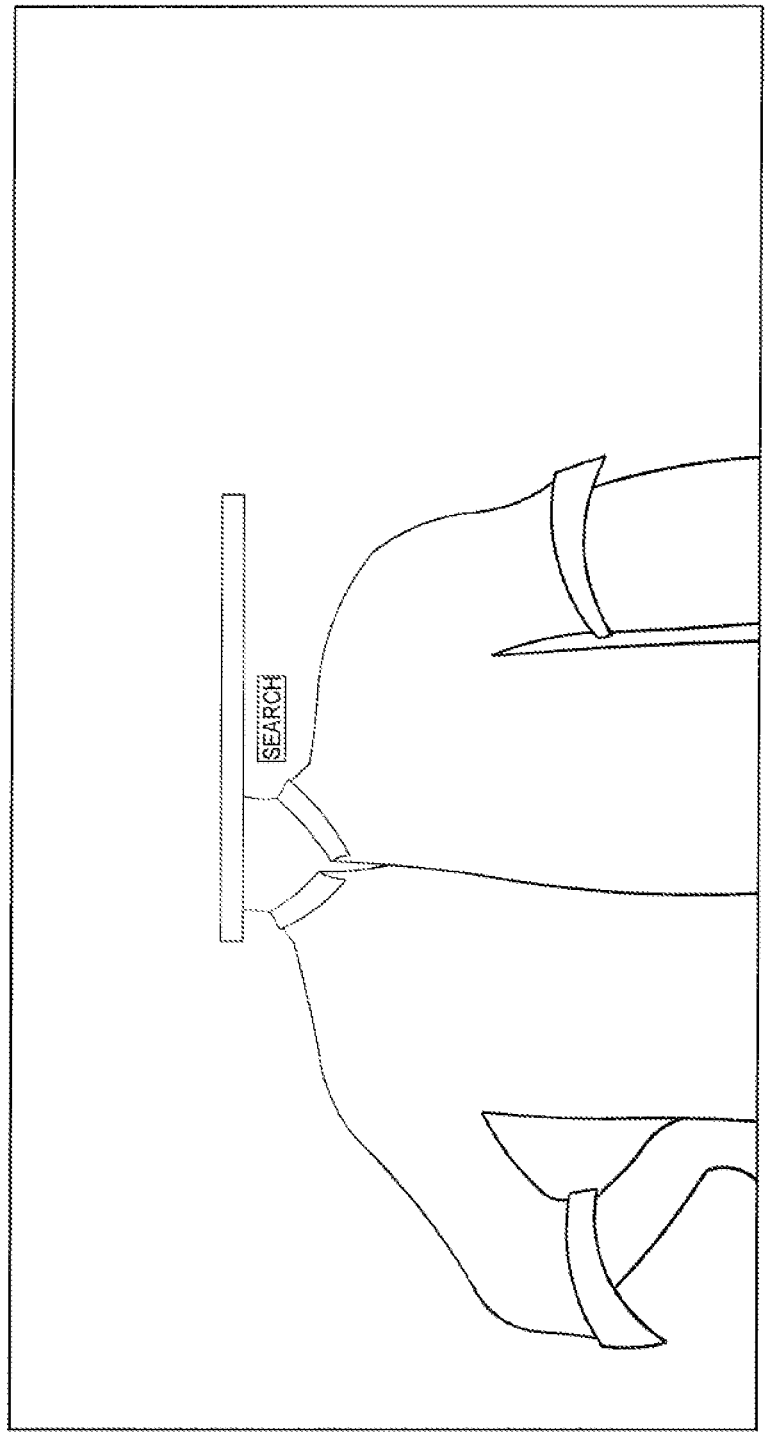
FIG. 1A is an explanatory diagram illustrating an example of a combined image displayed by an image processing apparatus according to this embodiment on a display screen.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.
1. Image Processing Method (Information Processing Method) According to This Embodiment
2. Image Processing Apparatus (Information Processing Apparatus) According to This Embodiment
3. Program According to This Embodiment Image Processing Method According to This Embodiment Before the description of a configuration of the image processing apparatus (information processing apparatus, the same shall apply hereafter) according to this embodiment, the image processing method (information processing method, the same shall apply hereafter) according to this embodiment will be described. In addition, the image processing apparatus according to this embodiment that performs processes related to the image processing method according to this embodiment will be described hereinafter.

[1] Overview of Image Processing Method According to This Embodiment

As described above, when a captured image and an operation target image are merely combined and displayed on a display screen, there is a problem in that visibility of an operation target object included in the operation target image is degraded. In addition, even when each of the captured image and the operation target image is displayed as a separate image in one of division regions into which the display screen is divided, there is a problem in that visibility of the operation target object included in the operation target image is degraded.

The image processing apparatus according to this embodiment changes a degree of visualization of the captured image to be displayed on the display screen based on the captured image or the operation target image including the operation target object, and combines the captured image whose degree of visualization has been changed with the operation target image (a combining process). The image processing apparatus according to this embodiment displays a combined image on the display screen (a display control process).

Here, for example, if an external imaging apparatus or the image processing apparatus according to this embodiment is provided with an imaging unit (to be described later), the captured image according to this embodiment is an image obtained by performing mirror-image processing (left-right reversal processing) of an image captured by the imaging unit (to be described later). The captured image according to this embodiment functions to feed back gesture recognition to the user. An image in which the captured image is combined is displayed on the display screen, so that the user can visually recognize content of his/her gesture such as causing his/her hand to slide, performing a pressing operation using his/her hand, or performing an enlargement operation, a reduction operation, or a moving operation using a plurality of fingers. Here, the mirror-image processing may be performed by the image processing apparatus according to this embodiment or an external apparatus such as an imaging apparatus performing imaging. In addition, an example of the captured image according to this embodiment is a moving image (or a plurality of still images). Hereinafter, an example in which the captured image according to this embodiment is a moving image including a plurality of frame images will be described.

The captured image according to this embodiment is not limited to an image subjected to the mirror-image processing (left-right reversal processing). For example, if a mirror image is captured by the imaging apparatus or the imaging unit (to be described), the captured image according to this embodiment may be an actual image that is captured.

In addition, an example of the operation target image according to this embodiment is an image including an operation target object operated according to the result of gesture recognition. Here, an example of the operation target image according to this embodiment is an image representing a web page, a menu screen of each device, or an operation screen. In addition, an example of the operation target object according to this embodiment is a button, an icon, or a link such as a hyperlink. A process related to the gesture recognition may be performed by the image processing apparatus according to this embodiment or an apparatus outside the image processing apparatus according to this embodiment.

In addition, an example of the display screen according to this embodiment is a display screen in an external display apparatus or a display screen in a display unit (to be described later) if the image processing apparatus according to this embodiment includes the display unit (to be described later).

The image processing apparatus according to this embodiment performs, for example, (1) Combining process and (2) Display Control Process, as the processes related to the image processing method according to this embodiment. Hereinafter, the processes related to the image processing method according to this embodiment will be specifically described.

(1) Combining Process

The image processing apparatus according to this embodiment changes a degree of visualization of a captured image to be displayed on a display screen based on a captured image or an operation target image. The image processing apparatus according to this embodiment combines the captured image whose degree of visualization has been changed with the operation target image.

Here, an example of the change in the degree of visualization of the captured image according to this embodiment is a change in a partial range in which the captured image is partially visualized, a change in a degree of smoothing to which the captured image is smoothed, or the like. In addition, an example of partial visualization of the captured image according to this embodiment is a change in a degree to which the captured image is transparent or a change in an area in which the captured image is displayed. Specific examples of the change in the degree of visualization of the captured image according to this embodiment will be described later.

(1-1) First Example of Process According to Change in Partial Range

The image processing apparatus according to this embodiment determines a partial range, for example, based on a predetermined target recognized from a captured image. The image processing apparatus according to this embodiment partially visualizes the captured image, for example, by changing a degree to which the captured image is transparent based on the determined partial range.

Here, an example of the predetermined target according to this embodiment is an object such as the user's face or the user's hand. The image processing apparatus according to this embodiment, for example, recognizes a face region including the user's face by detecting feature points such as the user's eye, nose, mouth, and skeletal structure or detecting a region similar to a luminance distribution or structure pattern of the face from the captured image. In addition, the image processing apparatus according to this embodiment recognizes an object of a recognition target such as the user's hand from the captured image, for example, by performing various image processing operations such as edge detection and pattern matching.

A process of recognizing the predetermined target in the image processing apparatus according to this embodiment is not limited to the above. For example, the image processing apparatus according to this embodiment may recognize a moving body as the predetermined target from the captured image, and determine a region including the recognized moving body as the partial range. Here, although the image processing apparatus according to this embodiment detects the moving body, for example, by detecting a difference between an image corresponding to a current frame and an image corresponding to a previous frame or detecting a change in a motion vector, a method of detecting the moving body is not limited to the above.

Hereinafter, examples of the process related to the change in the partial range according to this embodiment will be more specifically described.

[A] First Example: When Face is Recognized as Predetermined Target

When the face is recognized as the predetermined target, the image processing apparatus according to this embodiment recognizes the face from a captured image and determines a portion other than the recognized face as a partial range.

Figure 1B:
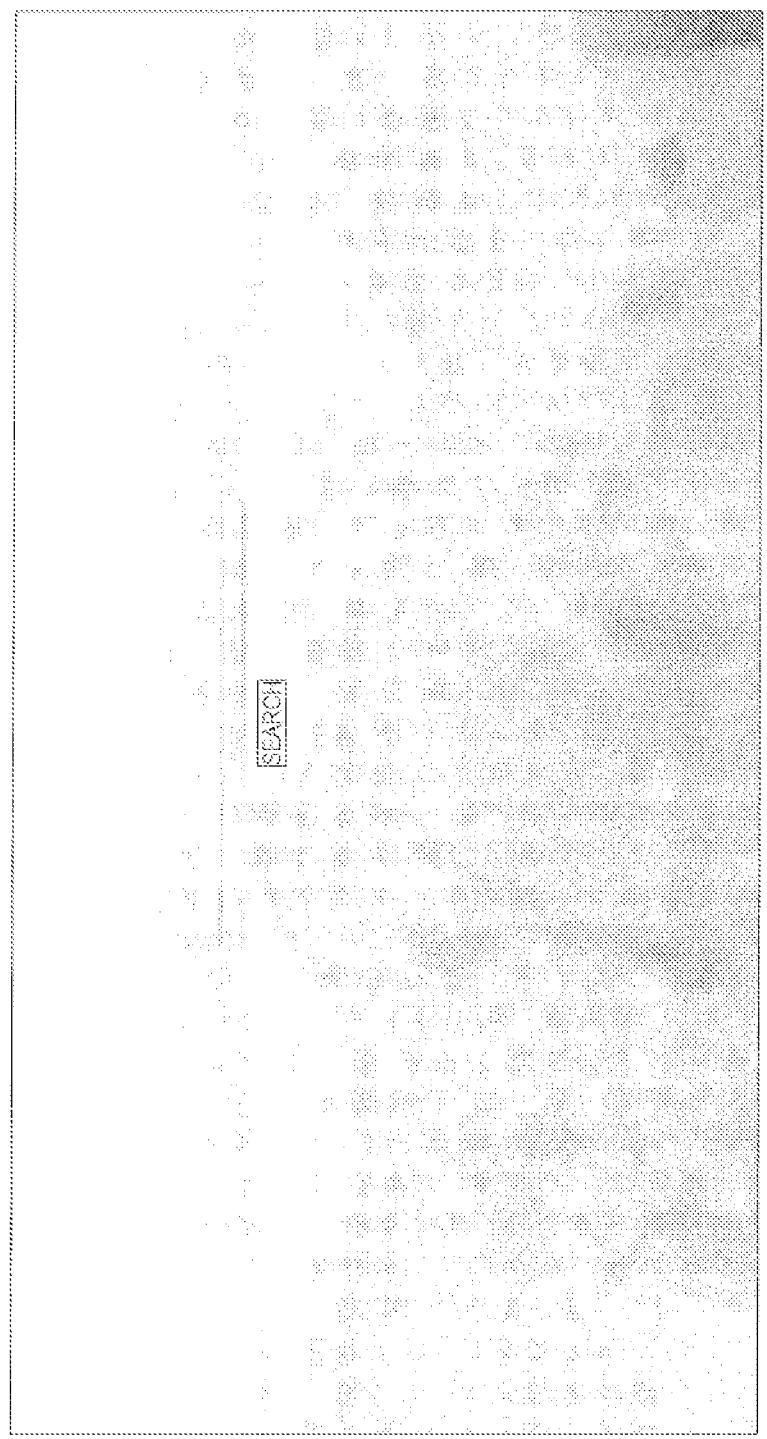
FIG. 1B is an explanatory diagram illustrating an example of a combined image displayed by the image processing apparatus according to this embodiment on a display screen.
Figure 2A:
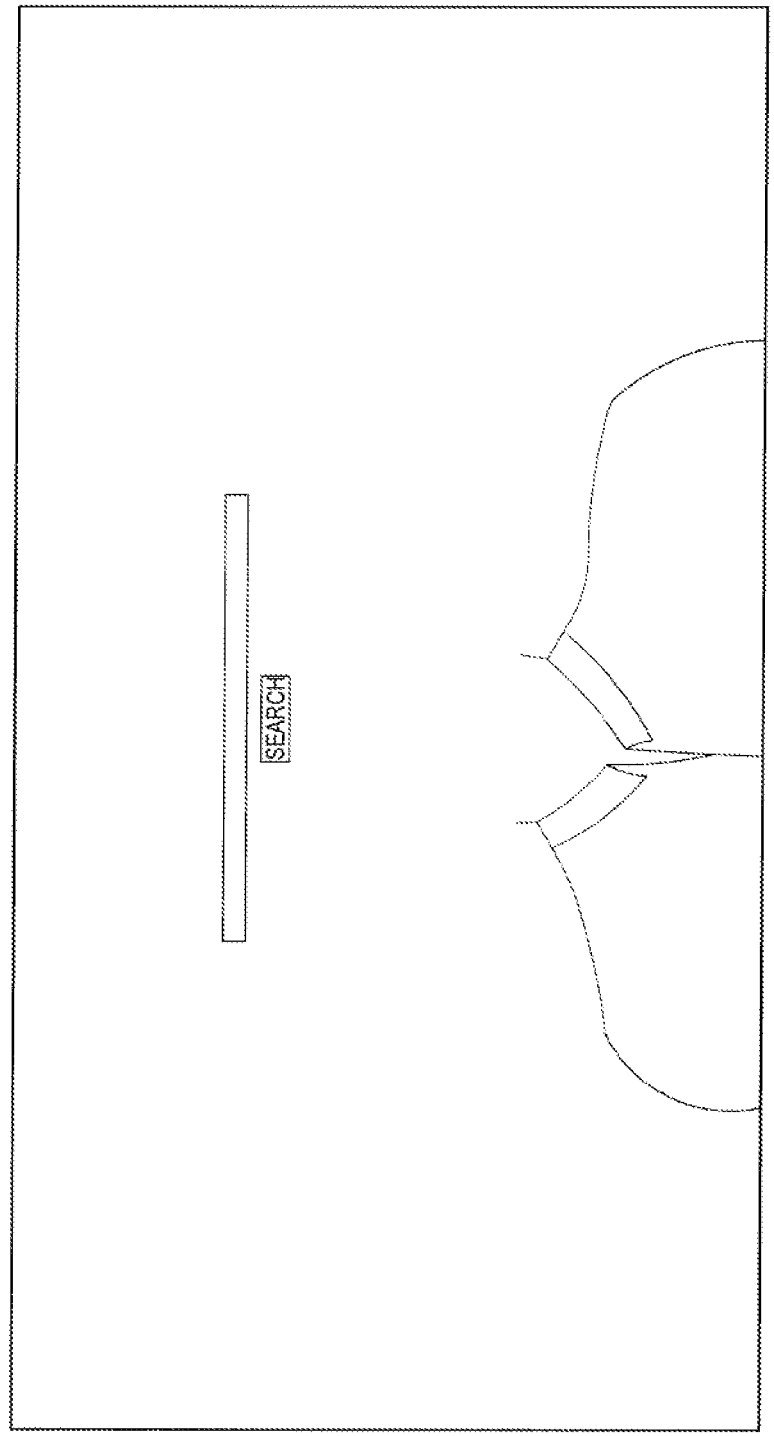
FIG. 2A is an explanatory diagram illustrating an example of a combined image displayed by the image processing apparatus according to this embodiment on a display screen.
Figure 2B:
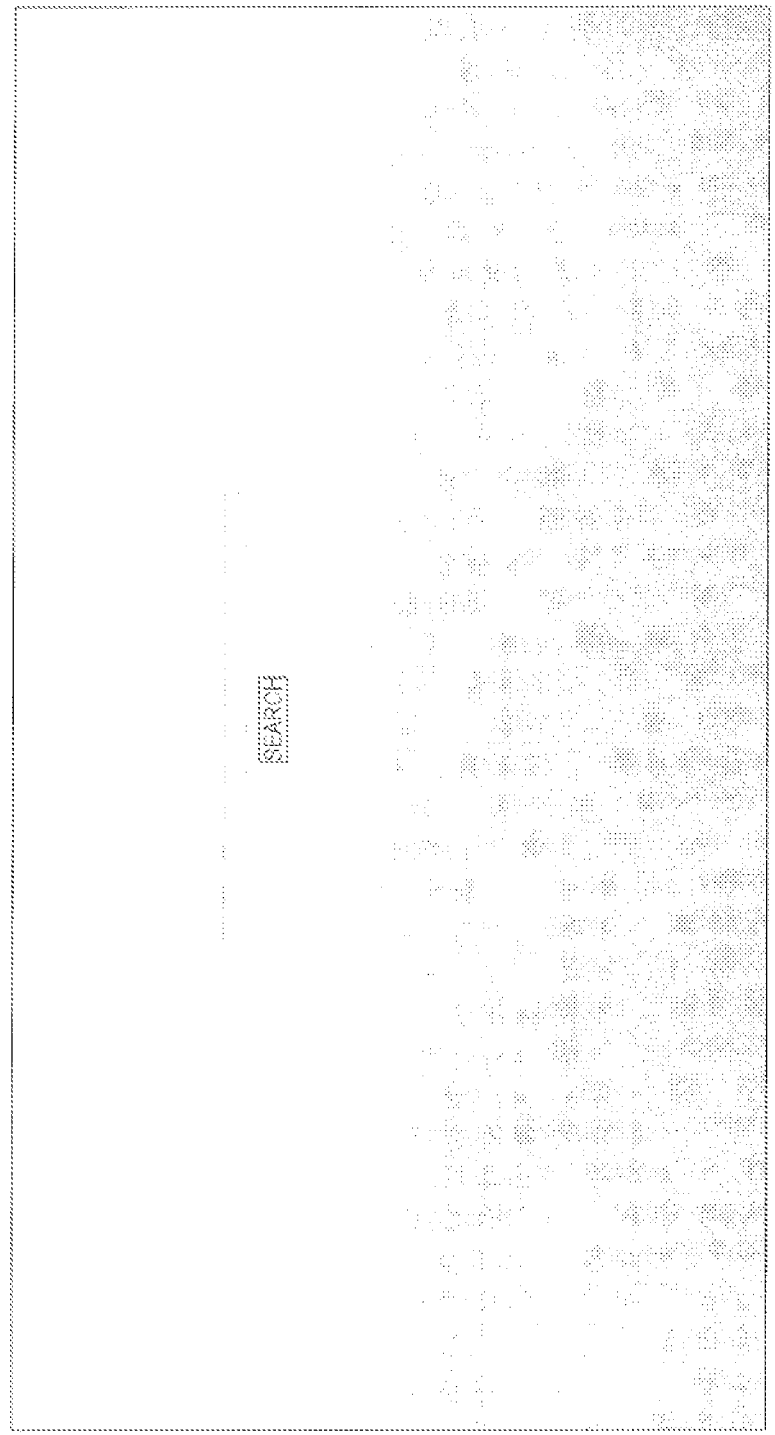
FIG. 2B is an explanatory diagram illustrating an example of a combined image displayed by the image processing apparatus according to this embodiment on a display screen.

FIGS. 1A, 1B, 2A, and 2B are explanatory diagrams illustrating examples of a combined image displayed by the image processing apparatus according to this embodiment on a display screen. Here, FIG. 1A is a conceptual diagram of the example illustrated in FIG. 1B, and FIG. 2A is a conceptual diagram of the example illustrated in FIG. 2B. In addition, FIGS. 1A, 1B, 2A, and 2B illustrate examples of an image when the image processing apparatus according to this embodiment determines a portion other than the face recognized from the captured image as the partial range.

The image processing apparatus according to this embodiment visualizes the portion other than the recognized face, for example, by performing a process of applying semi-transparent gradation from the recognized face region. Here, the image processing apparatus according to this embodiment may dynamically change a degree of transparency, for example, when the semi-transparent gradation is applied, according to a background portion (for example, a portion other than the recognized face region) of the captured image.

For example, the image processing apparatus according to this embodiment detects a spatial frequency or hue in the background portion of the captured image and dynamically changes the degree of transparency according to the detection result. For example, the image processing apparatus according to this embodiment further decreases the degree of transparency when the detected spatial frequency is higher (when the image is more complex), and further decreases the degree of transparency when the detected hue is darker. For example, as described above, the image processing apparatus according to this embodiment can prevent the visibility of the operation target object included in the operation target image from being degraded by further decreasing the degree of transparency when the detected spatial frequency is higher and further decreasing the degree of transparency when the detected hue is darker.

A process of dynamically changing the degree of transparency in the image processing apparatus according to this embodiment is not limited to the above. For example, the image processing apparatus according to this embodiment may specify a position of the operation target object from the operation target image (or data constituting the operation target image such as hypertext markup language (HTML) data or extensible markup language (XML) data), and decrease the degree of transparency in a region including the specified position. That is, the image processing apparatus according to this embodiment can change a partial range by determining the partial range in which the captured image is partially visualized based on the operation target object included in the operation target image.

Here, the image processing apparatus according to this embodiment may exclusively perform one of a process of changing the partial range based on the operation target object included in the operation target image and a process of changing the partial range based on the predetermined target recognized from the captured image, and may perform both of the processes. In addition, if the above-described two processes are performed, the image processing apparatus according to this embodiment may set priority for each process, for example, such as setting higher priority for the process of changing the partial range based on the operation target object included in the operation target image.

For example, as described above, the image processing apparatus according to this embodiment can prevent the visibility of the operation target object included in the operation target image from being degraded by dynamically changing the degree of transparency based on the position of the operation target object.

Although the image processing apparatus according to this embodiment, for example, designates the entire captured image as a region of a target for determining the partial range, the region of the target for determining the partial range according to this embodiment is not limited to the above. For example, the image processing apparatus according to this embodiment recognizes a user from the captured image, and crops a partial region including the user recognized in the captured image from the captured image. The image processing apparatus according to this embodiment, for example, may designate the cropped region as the region of the target for determining the partial range.

More specifically, the image processing apparatus according to this embodiment, for example, detects a face region from the captured image. The image processing apparatus according to this embodiment determines a region having a predetermined size corresponding to a size of the detected face region as a region including the user whose face has been detected, for example, by referring to a lookup table in which the size of the face region is associated with a size of the region (cropped region) including the user. A method of determining the region including the user according to this embodiment is not limited to the above. For example, the image processing apparatus according to this embodiment can determine a minimum region including the user as the region including the user based on a result of face-region detection and a result of an edge detection process.

FIG. 3 is an explanatory diagram illustrating an example of a process of cropping a region including a user from a captured image in the image processing apparatus according to this embodiment. A illustrated in FIG. 3 illustrates the entire captured image, and B illustrated in FIG. 3 illustrates a region AR' obtained by cropping and scaling a region AR of a target for determining a partial range illustrated in A of FIG. 3.

For example, as illustrated in FIG. 3, the image processing apparatus according to this embodiment can perform further processing, such as scaling the region of the target for determining the partial range cropped from the captured image, in addition to cropping. Needless to say, the image processing apparatus according to this embodiment may not perform the further processing such as scaling for the region of the target for determining the partial range cropped from the captured image.

In addition, the image processing apparatus according to this embodiment may correct a position of combination, for example, such as combining the region AR' at the center in a horizontal direction of the operation target image, for example, if the region AR' (an example of a region based on a region cropped from the captured image) illustrated in B of FIG. 3 is combined with the operation target image.

Although one user is included in the captured image in FIGS. 1A to 3, a plurality of users may be included in the captured image according to this embodiment. The image processing apparatus according to this embodiment crops a partial region including a recognized user from the captured image for each recognized user if the plurality of users have been recognized from the captured image. The image processing apparatus according to this embodiment designates each cropped region (or a region subjected to further processing such as scaling for each region) as a region of a target for determining a partial range corresponding to each recognized user. In addition, even when the plurality of users have been recognized from the captured image, the image processing apparatus according to this embodiment can correct a position in which each cropped region is combined with the operation target image.

In addition, if the plurality of users have been recognized from the captured image, a process related to gesture recognition may be performed by the image processing apparatus according to this embodiment or the external apparatus, for example, independently for each recognized user, in cooperation according to operations of the plurality of users, or exclusively. In addition, if the plurality of users have been recognized from the captured image, the process related to the gesture recognition may be performed by the image processing apparatus according to this embodiment or the external apparatus, according to priority set for each user. Here, there are various methods, for example, such as setting high priority for a first recognized user, a last recognized user, or a user for which the size of a partial region including the recognized user is largest, as the above-described priority setting method.

[B] When Hand is Recognized as Predetermined Target

If the hand is recognized as the predetermined target, the image processing apparatus according to this embodiment recognizes the hand from a captured image and determines a region including the recognized hand as a partial range. Here, the image processing apparatus according to this embodiment, for example, may recognize the hand from the entire captured image or recognize the hand from a region cropped from the captured image as illustrated in FIG. 3.

In addition, the image processing apparatus according to this embodiment visualizes the region including the hand, for example, by performing a process of applying a mask to a region other than the region including the recognized hand in the captured image. In addition, the image processing apparatus according to this embodiment may visualize the region including the recognized hand, for example, by performing a process of applying semi-transparent gradation. Here, if the process of applying the semi-transparent gradation is performed, the image processing apparatus according to this embodiment may dynamically change a degree of transparency, for example, when the semi-transparent gradation is applied, according to a background portion of the captured image as in the process related to the above-described first example.

[C] Third Example: When Moving Body is Recognized as Predetermined Target

If the moving body is recognized as the predetermined target, the image processing apparatus according to this embodiment recognizes the moving body as the predetermined target from a captured image, and determines a region including the recognized moving body as a partial range. Here, the image processing apparatus according to this embodiment, for example, may recognize the moving body from the entire captured image, or recognize the moving body from a region cropped from the captured image as illustrated in FIG. 3.

Figure 4A:
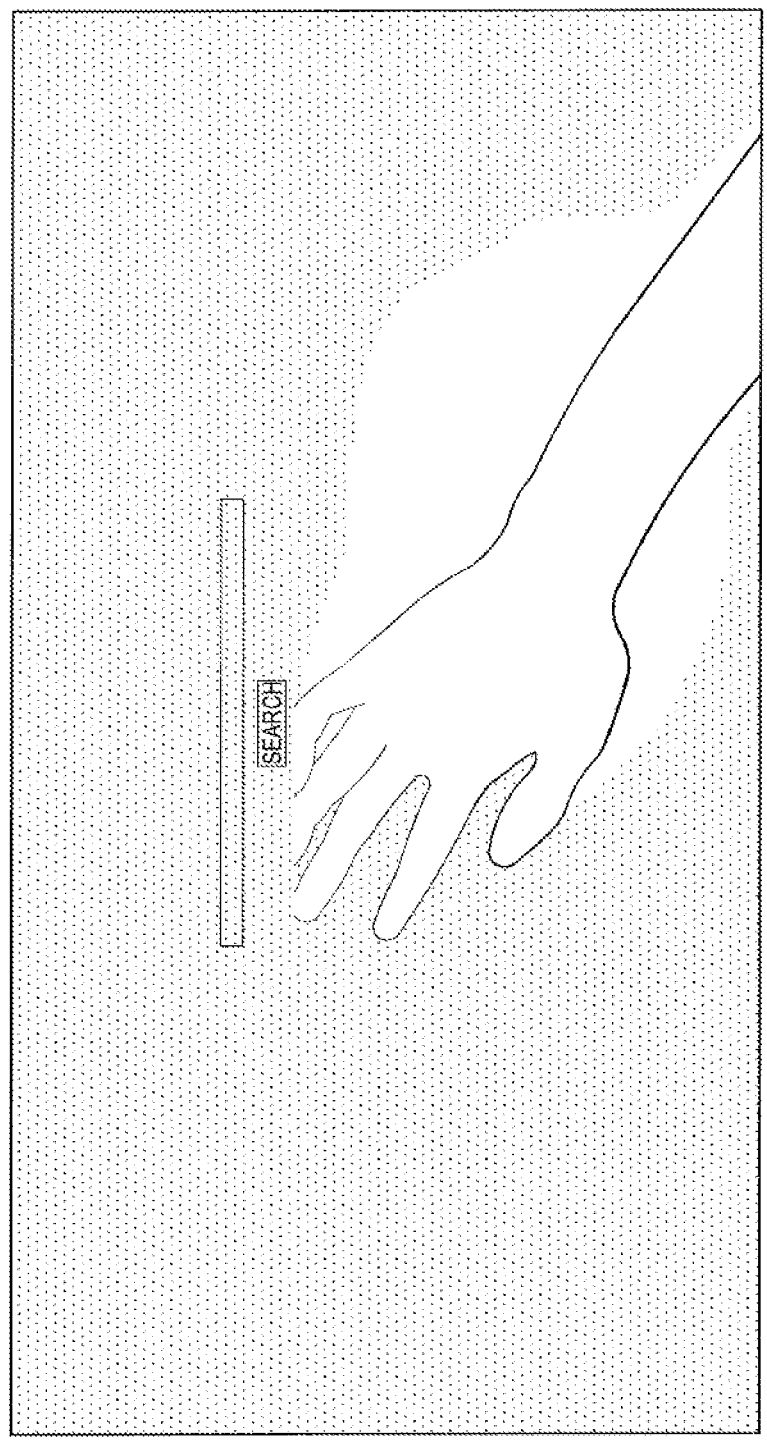
FIG. 4A is an explanatory diagram illustrating an example of a combined image displayed by the image processing apparatus according to this embodiment on a display screen.

FIGS. 4A and 4B are explanatory diagrams illustrating examples of a combined image displayed by the image processing apparatus according to this embodiment on a display screen. Here, FIG. 4A is a conceptual diagram of the example illustrated in FIG. 4B. In addition, FIGS. 4A and 4B illustrate examples of an image when the image processing apparatus according to this embodiment has determined a region in which a moving body has been recognized from a captured image as a partial range.

The image processing apparatus according to this embodiment visualizes the region in which the moving body has been recognized, for example by visualizing the region in which the moving body has been recognized as if a hand had been dragged across frosted glass as illustrated in FIGS. 4A and 4B. Needless to say, the image displayed on a display screen when the moving body is recognized as the predetermined target is not limited to the examples illustrated in FIGS. 4A and 4B.

(1-2) Second Example of Process Related to Change in Partial Range

An example in which the image processing apparatus according to this embodiment determines the partial range based on the predetermined target recognized from the captured image and partially visualizes the captured image based on the determined partial range has been described as the first example of the process related to the change in the partial range. However, the process related to the change in the partial range in the image processing apparatus according to this embodiment is not limited to the above-described example. For example, the image processing apparatus according to this embodiment can change the partial range in which the captured image is partially visualized by changing an area in which the captured image is displayed.

Figure 5:
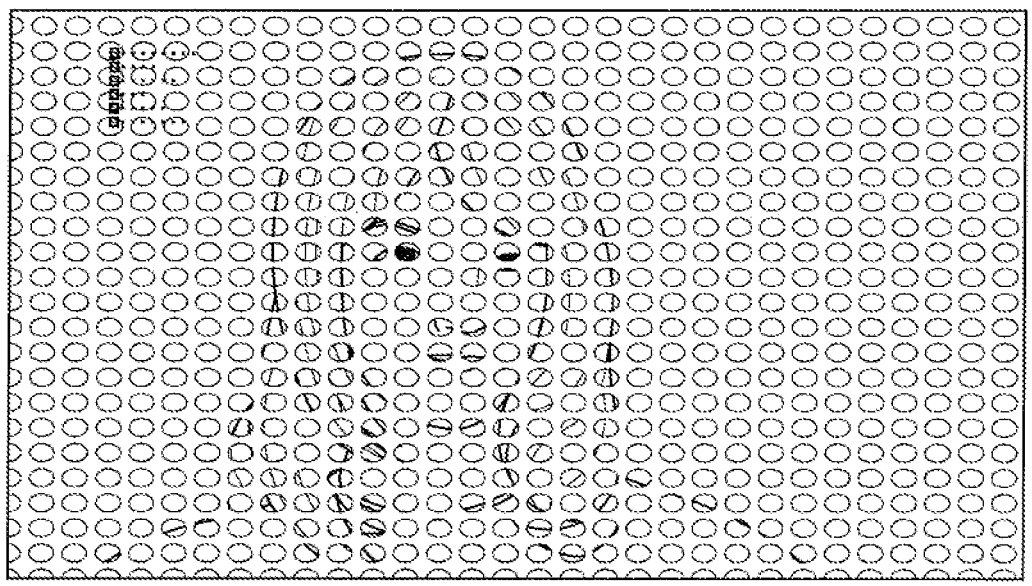
FIG. 5 is an explanatory diagram illustrating an example of a combined image displayed by the image processing apparatus according to this embodiment on a display screen.

FIG. 5 is an explanatory diagram illustrating an example of a combined image displayed by the image processing apparatus according to this embodiment on a display screen. Here, FIG. 5 illustrates an example in which a partial range in which a captured image is visualized is changed by applying a mask to the captured image.

The image processing apparatus according to this embodiment decreases an area in which the captured image is displayed, and changes the partial range in which the captured image is visualized by applying the mask to the captured image, for example, as illustrated in FIG. 5.

The process in the image processing apparatus according to this embodiment is not limited to the example illustrated in FIG. 5. Although the image processing apparatus according to this embodiment, for example, applies a uniform mask to the entire captured image in FIG. 5, the image processing apparatus according to this embodiment may dynamically change, for example, the density or shape of the mask. For example, the image processing apparatus according to this embodiment specifies a position of an operation target object from an operation target image (or data constituting an operation target image such as HTML data or XML data) and decreases the density of the mask on a region including the specified position or around the region. That is, the image processing apparatus according to this embodiment can change the partial range by determining the partial range in which the captured image is partially visualized based on the operation target object included in the operation target image.

For example, as described above, the image processing apparatus according to this embodiment can prevent the visibility of the operation target object included in the operation target image from being degraded by dynamically changing the density or shape of the mask based on the position of the operation target object.

Figure 6:
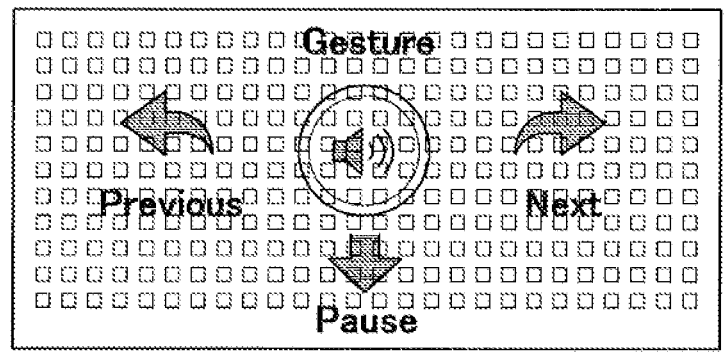
FIG. 6 is an explanatory diagram illustrating an example of an operation panel displayed by the image processing apparatus according to this embodiment on a display screen.

In addition, the image processing apparatus according to this embodiment may apply the mask to the operation panel (an example of the operation target object) displayed on a part of the display screen without being limited to the application of the mask to the entire captured image. FIG. 6 is an explanatory diagram illustrating an example of the operation panel displayed by the image processing apparatus according to this embodiment on the display screen. Needless to say, the operation panel displayed by the image processing apparatus according to this embodiment on the display screen is not limited to the example illustrated in FIG. 6.

(1-3) Third Example of Process Related to Change in Partial Range

Figure 7:
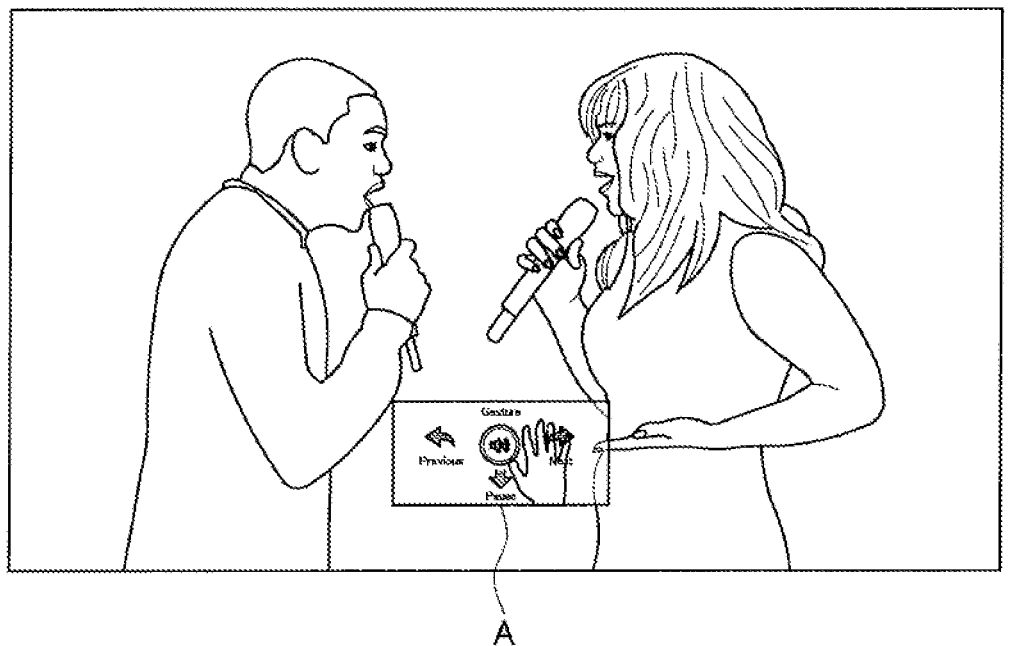
FIG. 7 is an explanatory diagram illustrating an example of a combined image displayed by the image processing apparatus according to this embodiment on a display screen.

In the image processing apparatus according to this embodiment, the process related to the change in the partial range is not limited to the above-described first and second examples. FIG. 7 is an explanatory diagram illustrating an example of a combined image displayed by the image processing apparatus according to this embodiment on a display screen.

For example, as a method of feeding back a gesture to a user so that the user can view content without interference as much as possible if an image representing content related to television broadcasting or the like is displayed on the display screen, an on-screen display (OSD) is displayed on a part of the display screen, for example, as illustrated in FIG. 7. Here, in FIG. 7, an example in which the operation panel (an example of the operation target object) with which a part of the captured image is combined in a part of the display screen is displayed as illustrated in A of FIG. 7.

Here, for example, if only an icon is displayed on the OSD, a situation in which feedback for the user is not sufficient, for example, such as "the case in which it is not known how much the arm should move when a left/right flick operation (an example of the gesture) is performed" or "the case in which an operation failure cause (for example, out of an angle of view of the imaging apparatus or the like) is not known when an operation is not suitably performed," may occur.

On the other hand, the image processing apparatus according to this embodiment combines a part cropped from the captured image with the operation panel, for example, as illustrated in A of FIG. 7. For example, as illustrated in FIG. 7, the image processing apparatus according to this embodiment displays the operation panel combined with the captured image on the display screen. Consequently, the image as illustrated in FIG. 7 is displayed on the display screen, so that the user can more easily understand that "the gesture is recognized if the hand is shaken to an extent to which the hand is in contact with the icon" or that "the operation is not suitably performed because an angle of view or recognition of the imaging apparatus is out of range."

Figure 8:
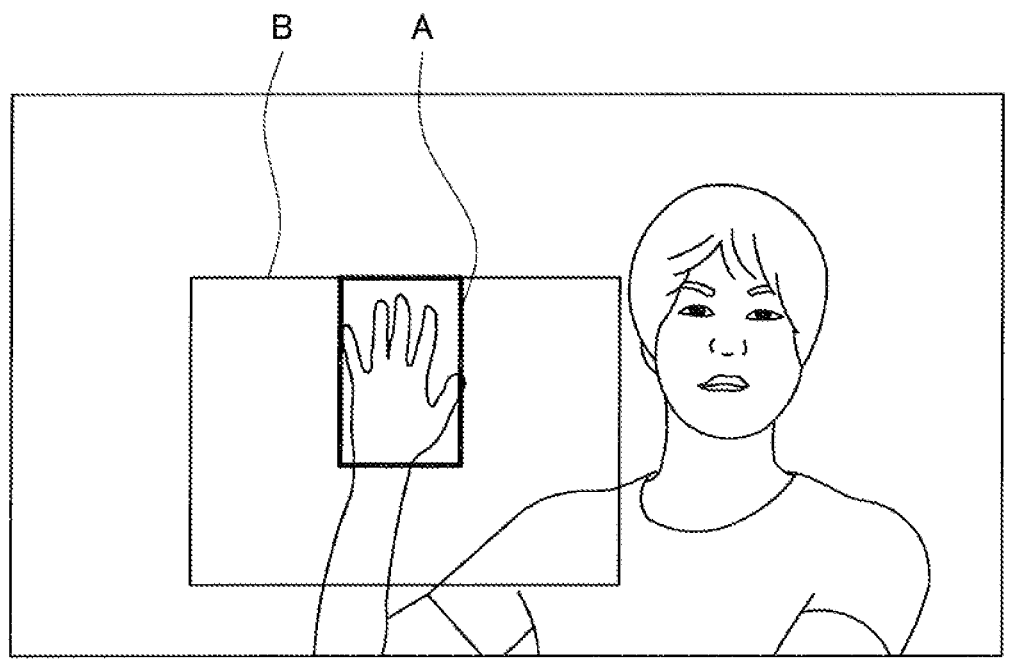
FIG. 8 is an explanatory diagram illustrating an example of a process of displaying the combined image as illustrated in FIG. 7 in the image processing apparatus according to this embodiment.

Here, an example of a process of displaying the combined image as illustrated in FIG. 7 in the image processing apparatus according to this embodiment will be more specifically described. FIG. 8 is an explanatory diagram illustrating the example of the process of displaying the combined image as illustrated in FIG. 7 in the image processing apparatus according to this embodiment. FIG. 8 illustrates an example of a captured image. Hereinafter, an example in which the image processing apparatus according to this embodiment recognizes a user's hand as a gesture recognition target for recognizing the user's gesture will be described.

When recognizing the hand (an example of the gesture recognition target) from the captured image, the image processing apparatus according to this embodiment determines a region (B illustrated in FIG. 8) defining a range in which the gesture is recognized based on a region (A illustrated in FIG. 8) including the recognized hand. The image processing apparatus according to this embodiment, for example, designates a larger region including the region including the recognized hand as the region defining the range in which the gesture is recognized. Here, although a size of the larger region including the region including the recognized hand is determined, for example, according to a size of the region including the recognized hand, a method of determining the size of the larger region including the region including the recognized hand is not limited to the above. For example, lower and upper limits of the above-described size of the larger region including the region including the recognized hand may be set. The user may set the above-described size of the larger region including the region including the recognized hand. For example, the region defining the range in which the gesture is recognized is determined as described above, so that a region around the region including the recognized hand is determined as the region defining the range in which the gesture is recognized.

If the region defining the range in which the gesture is recognized is determined, the image processing apparatus according to this embodiment trims the region defining the range in which the above-described gesture is recognized from the captured image, and combines the trimmed region with the operation panel. The image processing apparatus according to this embodiment displays the combined operation panel on the display screen.

Here, although the image processing apparatus according to this embodiment displays the operation panel combined in a predefined position of the display screen, the image processing apparatus according to this embodiment does not limit the position in which the combined operation panel is displayed to the above. For example, the image processing apparatus according to this embodiment may display the combined operation panel in a position corresponding to a position of the hand (an example of the gesture recognition target) first recognized from the captured image.

(1-4) Process Related to Change in Degree of Smoothing to Which Captured Image is Smoothed Although the process related to the change in the partial range has been described above as the process related to the image processing method in the image processing apparatus according to this embodiment, the process related to the image processing method according to this embodiment is not limited to the above. For example, the image processing apparatus according to this embodiment may change a degree of smoothing to which the captured image is smoothed as a process of changing a degree of visualization.

Figure 9:
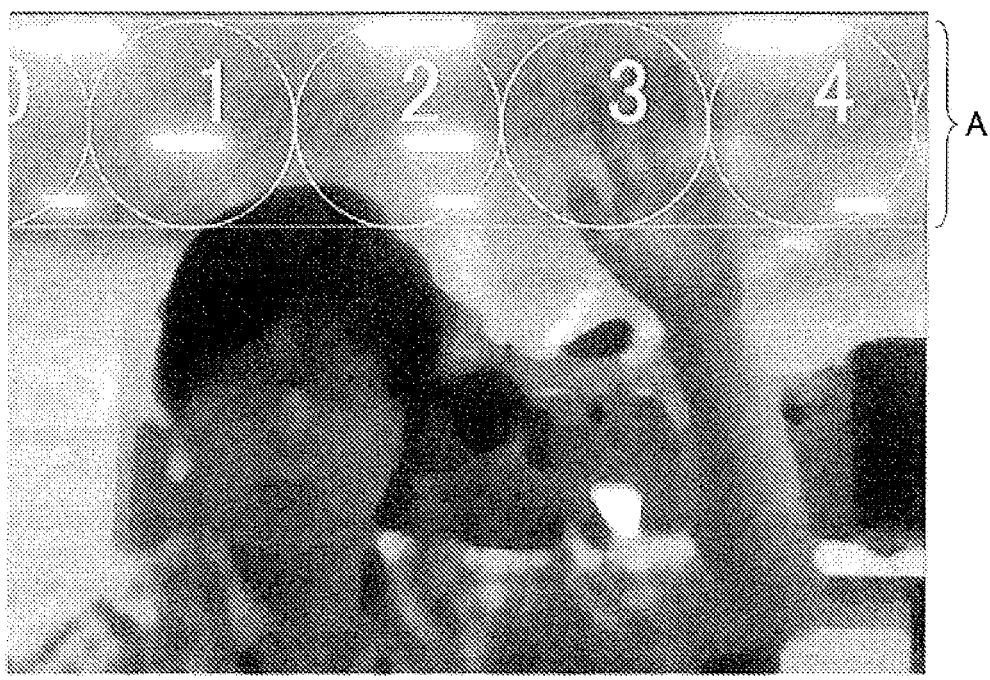
FIG. 9 is an explanatory diagram illustrating an example of a combined image displayed by the image processing apparatus according to this embodiment on a display screen.

FIG. 9 is an explanatory diagram illustrating an example of a combined image displayed by the image processing apparatus according to this embodiment on a display screen. Here, FIG. 9 illustrates an example of an image obtained by giving a painterly effect (for example, a brush/pen effect or the like) to a captured image as if drawn by a painter.

The image processing apparatus according to this embodiment, for example, calculates a vector direction of an edge in an image (or an angle between a vector and a standard direction such as a vertical direction or a horizontal direction of an image), and adjusts a filtering level of an edge-preserving smoothing filter based on the vector direction. The image processing apparatus according to this embodiment gives a painterly effect to a captured image by smoothing the captured image using the adjusted edge-preserving smoothing filter. Here, an example of the edge-preserving smoothing filter according to this embodiment is a smoothing filter capable of preserving an edge, for example, such as a bilateral filter.

A process of giving the painterly effect to the captured image in the image processing apparatus according to this embodiment is not limited to the above. The image processing apparatus according to this embodiment can use arbitrary technology capable of giving the painterly effect to the captured image. In addition, the image processing apparatus according to this embodiment may give a blur effect to the captured image, for example, by applying a Gaussian filter to the captured image.

In addition, for example, as illustrated in A of FIG. 9, the image processing apparatus according to this embodiment can combine an operation target object such as a scroll bar.

Figure 10:
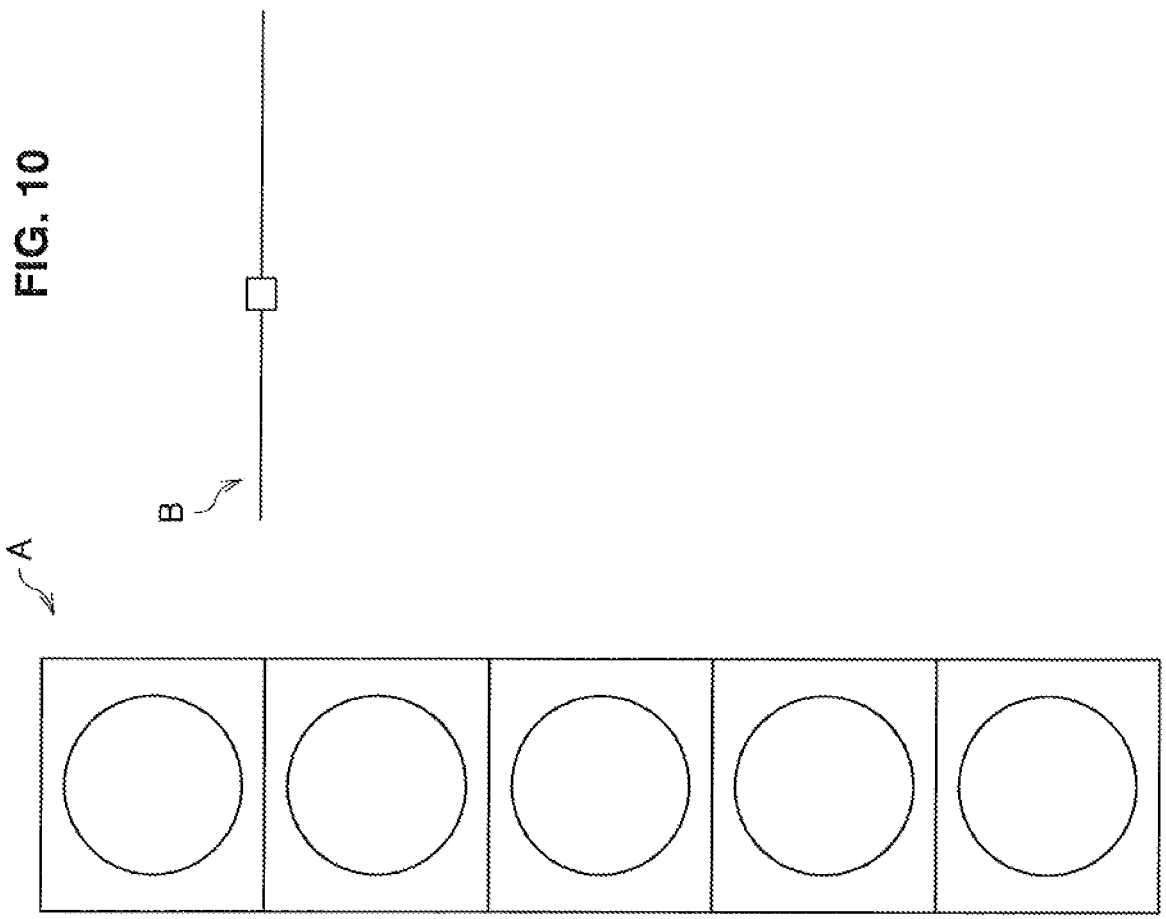
FIG. 10 is an explanatory diagram illustrating an example of an operation target object according to this embodiment.

The operation target object with which the image processing apparatus according to this embodiment can combine the captured image is not limited to the example illustrated in A of FIG. 9. FIG. 10 is an explanatory diagram illustrating an example of the operation target object according to this embodiment. The example of the operation target object according to this embodiment is a vertical scroll bar illustrated in A of FIG. 10, a slide bar illustrated in B of FIG. 10, a dial illustrated in C of FIG. 10, a button illustrated in D of FIG. 10, or the like.

(1-5) Other Example of Change in Degree of Visualization of Captured Image According to this Embodiment A process related to an image processing method according to this embodiment is not limited to the processes shown in the above-described (1-1) to (1-4). For example, the image processing apparatus according to this embodiment may recognize a predetermined target from a captured image and change a degree of visualization of a partial region including a predetermined target recognized in the captured image to a degree of visualization of the other region (a region excluding the partial region in the captured image) in the captured image.

Here, as in the first example of the process according to the change in the above-described partial range, the predetermined target according to this embodiment, for example, includes an object such as the user's face or the user's hand. In addition, the image processing apparatus according to this embodiment, for example, may recognize part of an object such as the user's fingertip as the predetermined target. In the image processing apparatus according to this embodiment, an object serving as the predetermined target according to this embodiment, for example, includes an object (or part of the object) available as a pointer.

Figure 11:
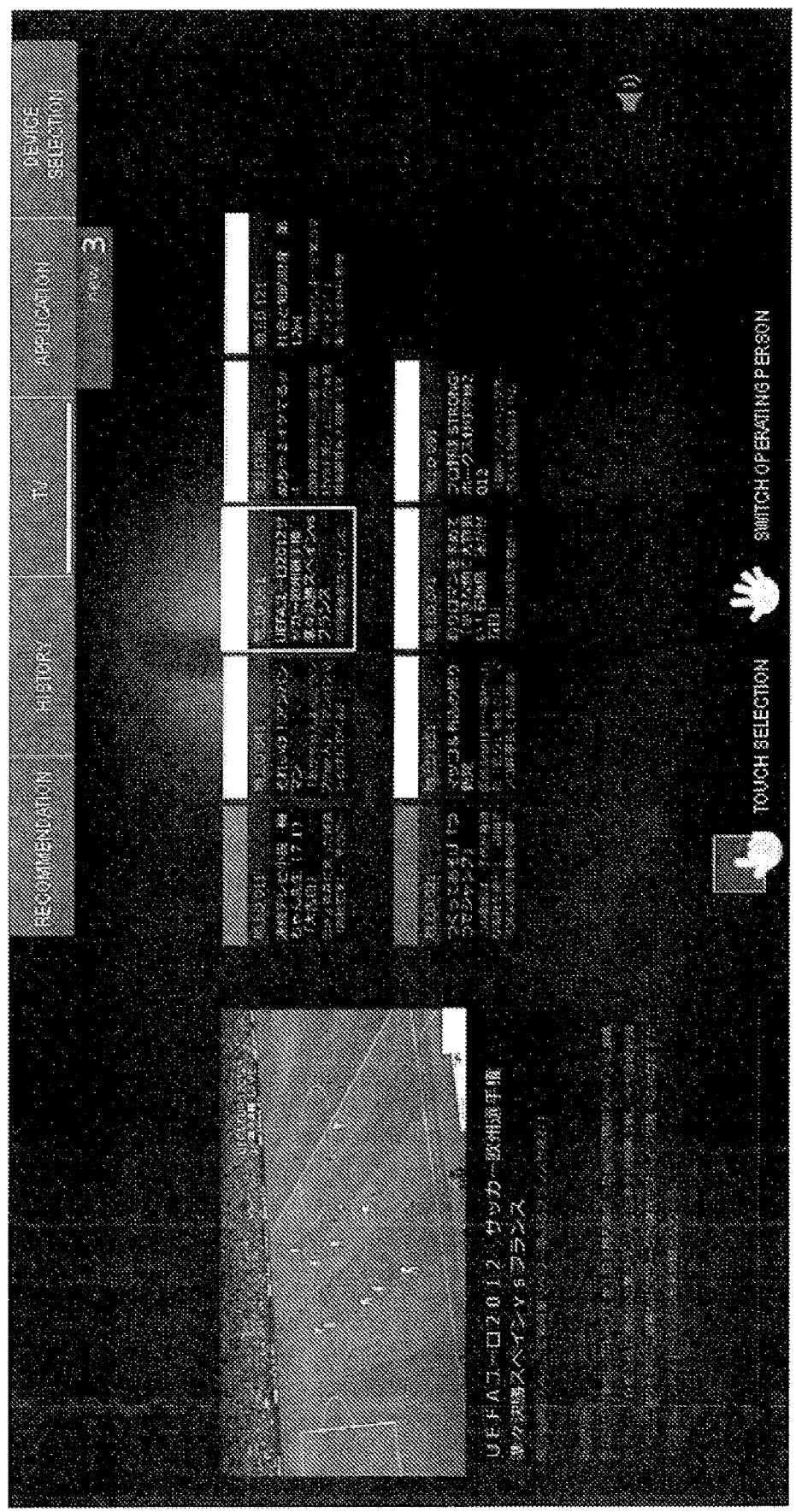
FIG. 11 is an explanatory diagram illustrating an example of a combined image displayed by the image processing apparatus according to this embodiment on the display screen.

FIG. 11 is an explanatory diagram illustrating an example of a combined image displayed by the image processing apparatus according to this embodiment on the display screen, and illustrates another example of the change in the degree of the visualization of the captured image according to this embodiment. Here, FIG. 11 illustrates an example in which the image processing apparatus according to this embodiment recognizes the user's fingertip as the predetermined target according to this embodiment and sets an elliptic region including the fingertip recognized in the captured image as the partial region according to this embodiment. In addition, FIG. 11 illustrates an example in which the image processing apparatus according to this embodiment sets luminance of the partial region including the predetermined target recognized from the captured image to luminance higher than that of the other region. The image processing apparatus according to this embodiment, for example, sets the luminance of the partial region to the luminance higher than that of the other region by applying a mask corresponding to the partial region including the predetermined target recognized from the captured image and/or the other region to the captured image.

Also, the partial region according to this embodiment is not limited to the elliptic region, and, for example, may be a region of an arbitrary shape. In addition, a process of setting the luminance of the partial region including the predetermined target recognized from the captured image to the luminance higher than that of the other region is not limited to the use of the mask. The image processing apparatus according to this embodiment, for example, can use an arbitrary process by which the luminance can be adjusted.

The image processing apparatus according to this embodiment, for example, illuminates the partial region more brightly than the other region by "setting the luminance of the partial region including the predetermined target recognized from the captured image to luminance higher than that of the other region in the captured image" or "setting the luminance of the other region to luminance less than that of the partial region in the captured image" as illustrated in FIG. 11. As described above, a display as if the partial region were lit by a candle is implemented by illuminating the partial region in the captured image including the predetermined target recognized from the captured image more brightly than the other region in the captured image.

For example, as illustrated in FIG. 11, the luminance of the partial region in the captured image including the predetermined target recognized from the captured image and the luminance of the other region in the captured image are changed and therefore the degree of the visualization of the partial region and the degree of the visualization of the other region are changed. Consequently, the user viewing the combined image displayed on the display screen, for example, can more easily recognize a fingertip (an example of the predetermined target according to this embodiment) used as the pointer. Therefore, for example, as illustrated in FIG. 11, the image processing apparatus according to this embodiment can improve the operability of the user by changing the luminance of the partial region in the captured image including the predetermined target recognized from the captured image and the luminance of the other region in the captured image.

Also, the other example of the change in the degree of the visualization of the captured image according to this embodiment is not limited to the example illustrated in FIG. 11.

For example, the image processing apparatus according to this embodiment may set the luminance of the partial region in the captured image including the predetermined target recognized from the captured image to luminance less than that of the other region. Even when the luminance of the partial region in the captured image including the predetermined target recognized from the captured image is set to be less than that of the other region, the degree of the visualization of the partial region and the degree of the visualization of the other region are changed. Consequently, even when the image processing apparatus according to this embodiment sets the luminance of the partial region in the captured image including the predetermined target recognized from the captured image to luminance less than that of the other region, the image processing apparatus according to this embodiment can improve the operability of the user.

The image processing apparatus according to this embodiment, for example, may change one or more of luminance, saturation, and colors of the partial region and the other region in the captured image including the predetermined target recognized from the captured image. The image processing apparatus according to this embodiment, for example, changes one or more of luminance, saturation, and colors using an arbitrary process by which the luminance, saturation, and colors can be adjusted such as the use of a mask. Even when one or more of the luminance, saturation, and colors of the partial region and the other region in the captured image including the predetermined target recognized from the captured image are changed, the degree of the visualization of the partial region and the degree of the visualization of the other region are changed. Consequently, even when the image processing apparatus according to this embodiment changes one or more of the luminance, saturation, and colors of the partial region and the other region in the captured image including the predetermined target recognized from the captured image, the image processing apparatus according to this embodiment can improve the operability of the user.

In addition, the image processing apparatus according to this embodiment, for example, may set one of the partial region and the other region in the captured image including the predetermined target recognized from the captured image as a monochromatic region and set the other as a color region. Even when one of the partial region and the other region in the captured image including the predetermined target recognized from the captured image is set as the monochromatic region and the other is set as the color region, the degree of the visualization of the partial region and the degree of the visualization of the other region are changed. Consequently, even when the image processing apparatus according to this embodiment sets one of the partial region and the other region in the captured image including the predetermined target recognized from the captured image as the monochromatic region and sets the other as the color region, the image processing apparatus according to this embodiment can improve the operability of the user.

In addition, the image processing apparatus according to this embodiment, for example, may change degrees of blurring of the partial region and the other region in the captured image including the predetermined target recognized from the captured image. Even when the degrees of blurring of the partial region and the other region in the captured image including the predetermined target recognized from the captured image are changed, the degree of the visualization of the partial region and the degree of the visualization of the other region are changed. Consequently, even when the image processing apparatus according to this embodiment changes the degrees of blurring of the partial region and the other region in the captured image including the predetermined target recognized from the captured image, the image processing apparatus according to this embodiment can improve the operability of the user. Here, an example in which the degrees of blurring of the partial region and the other region in the captured image including the predetermined target recognized from the captured image are changed, for example, includes "blurring the other region without blurring the partial region," "blurring the partial region without blurring the other region," "changing a level of a blurring process to be applied to the partial region (a blurring condition of the partial region) and a level of a blurring process to be applied to the other region (a blurring condition of the other region)," and the like.

In addition, the image processing apparatus according to this embodiment, for example, may display only the partial region in the captured image including the predetermined target recognized from the captured image (that is, may not display the other region). Even when only the partial region in the captured image including the predetermined target recognized from the captured image is displayed, the degree of the visualization of the partial region and the degree of the visualization of the other region are changed. Consequently, even when the image processing apparatus according to this embodiment displays only the partial region in the captured image including the predetermined target recognized from the captured image, the image processing apparatus according to this embodiment can improve the operability of the user.

The image processing apparatus according to this embodiment, for example, performs the processes shown in the above-described (1-1) to (1-5) as the process (combining process) of (1). Here, the image processing apparatus according to this embodiment, for example, performs the process of any one of the above-described (1-1) to (1-5). The image processing apparatus according to this embodiment, for example, may perform a prescribed process or a user-selected process. Also, the process (combining process) of (1) according to this embodiment is not limited to the processes shown in the above-described (1-1) to (1-5). For example, the image processing apparatus according to this embodiment can display an image in which a display frame is drawn for a recognized predetermined target on the display screen. In addition, the image processing apparatus according to this embodiment may combine part of the recognized predetermined target rather than the overall recognized predetermined target with the operation target image.

(2) Display Control Process

If the above-described process (combining process) (1) is completed, the image processing apparatus according to this embodiment displays a combined image on a display screen.

Here, if the image processing apparatus according to this embodiment displays the above-described image on the display screen of an external display apparatus, the image processing apparatus according to this embodiment causes the display apparatus to display the above-described image, for example, by transmitting an image signal representing the above-described image to the display apparatus. In addition, if the image processing apparatus displays the above-described image on the display screen of the display unit (to be described later), the image processing apparatus according to this embodiment displays the above-described image by transferring the image signal representing the above-described image to the display unit (to be described later).

The image processing apparatus according to this embodiment, for example, performs the above-described process (combining process) (1) and the above-described process (display control process) (2) as the processes related to the image processing method according to this embodiment. In the above-described process (combining process) (1), the image processing apparatus according to this embodiment changes a degree of visualization of the captured image and combines the captured image whose degree of visualization has been changed with the operation target image based on the captured image or the operation target image including the operation target object. In the above-described process (display control process) (2), the image processing apparatus according to this embodiment displays the combined image in the above-described process (combining process) (1) on the display screen.

Here, because the image processing apparatus according to this embodiment changes the degree of visualization of the captured image in the above-described process (combining process) (1), it is possible to prevent the visibility of the operation target object from being degraded even when the captured image and the operation target image are merely combined and displayed on the display screen.

Therefore, the image processing apparatus according to this embodiment can display the captured image and the operation target image on the display screen while preventing the visibility of the operation target object from being degraded.

If the image processing apparatus according to this embodiment determines the partial range in which the captured image is partially visualized based on the operation target object included in the operation target image in the above-described process (combining process) (1), it is possible to display an image in which the operation target object included in the operation target image is more clearly displayed on the display screen. Therefore, in the above-described case, the image processing apparatus according to this embodiment, for example, can further improve the visibility of the operation target object (that is, an operation target object constituting a GUI) included in the operation target image.

In addition, if the image processing apparatus according to this embodiment determines the partial range in which the captured image is partially visualized based on the predetermined target recognized from the captured image in the above-described process (combining process) (1), a face of the user who performs the operation is not displayed on the display screen, for example, as illustrated in FIGS. 1A to 2B. Therefore, in the above-described case, because the image processing apparatus according to this embodiment, for example, can implement an unrealistic mirror-image expression for the user, it is possible to feed back unrealistic gesture recognition to the user.

Further, because the image processing apparatus according to this embodiment changes the degree of visualization of the captured image in the above-described process (combining process) (1), it is possible to control visualization of a region unnecessary for an operation by a gesture even when the captured image and the operation target image are merely combined and displayed on the display screen. Therefore, because the image processing apparatus according to this embodiment, for example, enables the user to more easily perform an operation by a more precise gesture, it is possible to further improve the operability of the user.

Figure 12:
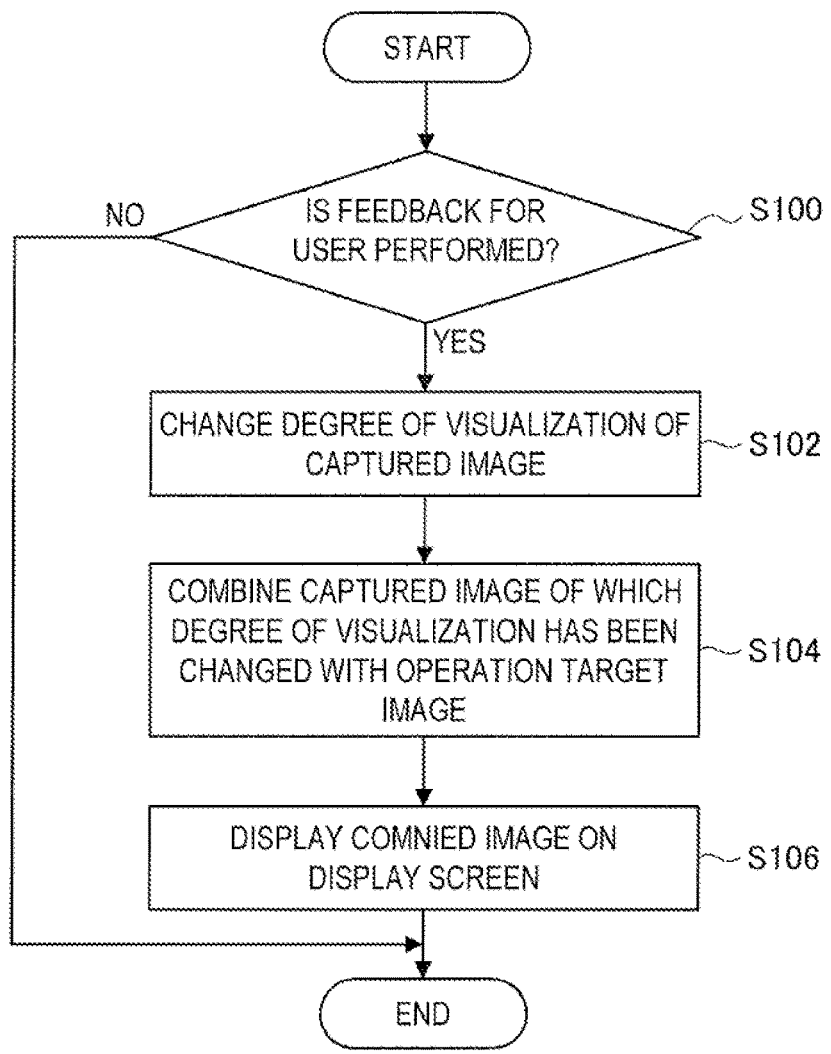
FIG. 12 is a flowchart illustrating an example of a process related to an image processing method according to this embodiment.

[2] Example of Process Related to Image Processing Method According to This Embodiment FIG. 12 is a flowchart illustrating an example of a process related to the image processing method according to this embodiment. Hereinafter, an example in which the image processing apparatus according to this embodiment performs the process illustrated in FIG. 12 will be described. Here, in FIG. 12, for example, the process of steps S100, S102, and S104 corresponds to the above-described process (combining process) (1), and the process of step S106 corresponds to the above-described process (display control process) (2).

The image processing apparatus according to this embodiment determines whether or not to perform feedback for the user (S100). Here, the process of step S100 corresponds to a process in which the image processing apparatus according to this embodiment determines whether or not to start a process related to the image processing method according to this embodiment.

The image processing apparatus according to this embodiment determines to perform the feedback for the user (that is, determines to start the process related to the image processing method according to this embodiment), for example, when a predetermined target has been recognized from the captured image. Here, an example of the above-described predetermined target is a gesture recognition target for recognizing the user's gesture such as a part of a body of the user such as the user's hand or a shape of an object to be operated by the user.

The process of step S100 according to this embodiment is not limited to the above. For example, the image processing apparatus according to this embodiment may determine whether or not to perform the feedback for the user based on an operation signal corresponding to the user's operation on an operation unit (to be described later) or an external operation signal corresponding to the user's operation on an external operation apparatus such as a remote controller. In addition, the image processing apparatus according to this embodiment may determine to perform the feedback for the user, for example, when a predetermined gesture has been recognized such as when the user shakes his or her hand. Although the image processing apparatus according to this embodiment recognizes a predetermined gesture, for example, by detecting the user's periodic operation based on a frequency of a luminance change in the captured image, a gesture recognition method in the image processing apparatus according to this embodiment is not limited to the above.

When determining not to perform the feedback for the user in step S100, the image processing apparatus according to this embodiment ends the process related to the image processing method according to this embodiment. The process related to the image processing method according this embodiment is iterated, for example, periodically, aperiodically, or every time an image signal representing a captured image is input, instead of not being re-performed once the process ends.

In addition, when determining to perform the feedback for the user in step S100, the image processing apparatus according to this embodiment changes a degree of visualization of the captured image (S102). The image processing apparatus according to this embodiment changes the degree of visualization of the captured image, for example, by changing a degree to which the captured image is transparent, changing an area in which the captured image is displayed, or changing a degree of smoothing to which the captured image is smoothed.

If a process of changing the degree of visualization of the captured image ends in step S102, the image processing apparatus according to this embodiment combines the captured image whose degree of visualization has been changed with the operation target image (S104). Here, if a region based on a region cropped from the captured image (or the region itself cropped from the captured image), for example, such as the region AR' illustrated in B of FIG. 3, is combined with the operation target image, the image processing apparatus according to this embodiment may correct a position in which the region is combined.

If the process related to combination between the captured image whose degree of visualization has been changed and the operation target image ends in step S104, the image processing apparatus according to this embodiment displays a combined image on the display screen (S106). The image processing apparatus according to this embodiment ends the process related to the image processing method according to this embodiment.

The image processing apparatus according to this embodiment implements the process (combining process) (1) and the process (display control process) (2) related to the image processing method according to this embodiment, for example, by performing the process illustrated in FIG. 12. Needless to say, the process related to the image processing method according to this embodiment is not limited to the process illustrated in FIG. 12.

Image Processing Apparatus According to This Embodiment

Next, an example of a configuration of the image processing apparatus according to this embodiment capable of performing the process related to the image processing method according to this embodiment will be described.

Figure 13:
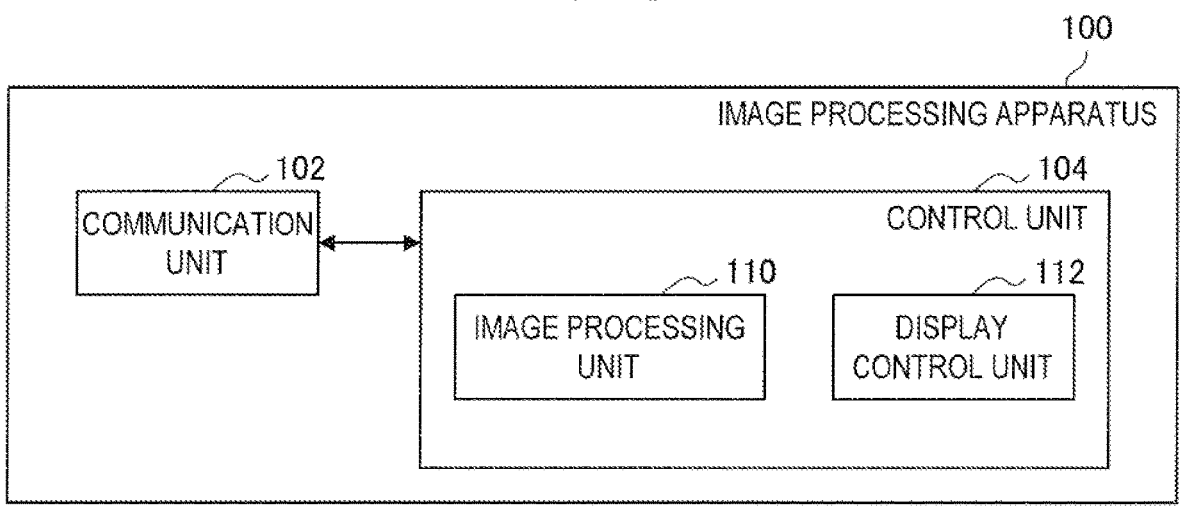
FIG. 13 is a block diagram illustrating an example of a configuration of the image processing apparatus according to this embodiment.

FIG. 13 is a block diagram illustrating an example of the configuration of the image processing apparatus 100 according to this embodiment. The image processing apparatus 100, for example, includes a communication unit 102 and a control unit (processing unit) 104.

In addition, the image processing apparatus 100 may include, for example, a read only memory (ROM) (not illustrated) or a random access memory (RAM) (not illustrated), a storage unit (not illustrated), an operation unit (not illustrated) capable of being operated by the user, a display unit (not illustrated) that displays various screens on a display screen, and the like. The image processing apparatus 100 establishes a connection between the above-described components by a bus, for example, as a transmission path for data.

Here, the ROM (not illustrated) stores programs to be used by the control unit 104 and control data such as arithmetic parameters. The RAM (not illustrated) temporarily stores programs and the like to be executed by the control unit 104.

The storage unit (not illustrated) is a storage means provided in the image processing apparatus 100, and, for example, stores data constituting the operation target image or various data such as an application. Here, an example of the storage unit (not illustrated) is a magnetic recording medium such as a hard disk or a nonvolatile memory such as an electrically erasable and programmable ROM (EEPROM) or a flash memory. In addition, the storage unit (not illustrated) may be attachable to or detachable from the image processing apparatus 100.

Hardware Configuration Example of Image Processing Apparatus 100

FIG. 13 is an explanatory diagram illustrating an example of a hardware configuration of the image processing apparatus 100 according to this embodiment. The image processing apparatus 100 includes, for example, a micro processing unit (MPU) 150, a ROM 152, a RAM 154, a recording medium 156, an input/output (I/O) interface 158, an operation input device 160, a display device 162, and a communication interface 164. In addition, the image processing apparatus 100 establishes a connection between the above-described components by a bus 166, for example, as a transmission path for data.

The MPU 150 functions as the control unit 104 that controls the entire image processing apparatus 100, for example, constituted by an MPU or various processing circuits. In addition, the MPU 150, for example, functions as an image processing unit 110 and a display control unit 112 in the image processing apparatus 100 as will be described later.

The ROM 152 stores programs to be used by the MPU 150 and control data such as arithmetic parameters, and the RAM 154 primarily stores, for example, programs and the like to be executed by the MPU 150.

The recording medium 156 functions as the storage unit (not illustrated), and, for example, stores data constituting the operation target image or various data such as an application. Here, an example of the recording medium 156 is a magnetic recording medium such as a hard disk or a nonvolatile memory such as a flash memory. In addition, the recording medium 156 may be attachable to or detachable from the image processing apparatus 100.

The I/O interface 158 is connected to, for example, the operation input device 160 and the display device 162. The operation input device 160 functions as an operation unit (not illustrated), and the display device 162 functions as a display unit (not illustrated). Here, an example of the I/O interface 158 is a universal serial bus (USB) terminal, a digital visual interface (DVI) terminal, a high-definition multimedia interface (HDMI) terminal, various processing circuits, or the like. In addition, the operation input device 160 is provided, for example, on the image processing apparatus 100, and is connected to the I/O interface 158 inside the image processing apparatus 100. An example of the operation input device 160 is a button, a direction key, a rotary selector such as a jog dial, or a combination thereof. In addition, the display device 162 is provided, for example, on the image processing apparatus 100, and is connected to the I/O interface 158 inside the image processing apparatus 100. An example of the display device 162 is a liquid crystal display (LCD), an organic electroluminescence (EL) display (which is also referred to as an organic light emitting diode (OLED) display), or the like.

Needless to say, the I/O interface 158 can be connected to an external device such as a display device (for example, an external display or the like) or an operation input device (for example, a keyboard, a mouse, or the like) as an apparatus outside the image processing apparatus 100. In addition, the display device 162 may be a device in which a display and the user's operation are possible, for example, such as a touch screen.

The communication interface 164 is a communication means provided in the image processing apparatus 100, and functions as the communication unit 102 for performing wireless/wired communication with an imaging apparatus, a display apparatus, or an external apparatus such as a server via the network (or directly). Here, an example of the communication interface 164 is a communication antenna and a radio frequency (RF) circuit (wireless communication), an Institute of Electrical and Electronics Engineers (IEEE) 802.15.1 port and a transmission/reception circuit (wireless communication), an IEEE 802.11b port and a transmission/reception circuit (wireless communication), or a local area network (LAN) terminal and a transmission/reception circuit (wired communication). In addition, an example of the network according to this embodiment is a wired network such as a LAN or a wide area network (WAN), a wireless network such as a wireless WAN (WWAN) via a wireless LAN (WLAN) or a base station, or the Internet using a communication protocol such as a transmission control protocol/Internet protocol (TCP/IP).

For example, according to the configuration illustrated in FIG. 14, the image processing apparatus 100 performs a process related to the display control method according to this embodiment. The hardware configuration of the image processing apparatus 100 according to this embodiment is not limited to the configuration illustrated in FIG. 14. For example, the image processing apparatus 100 may be provided with an imaging device that functions as an imaging unit (not illustrated) to capture a still image or a moving image. When the imaging device is provided, the image processing apparatus 100, for example, can process a captured image generated by imaging in the imaging device.

Here, examples of the imaging device according to this embodiment are a lens/imaging element and a signal processing circuit. The lens/imaging element is constituted by an image sensor using a plurality of imaging elements, for example, such as a lens of an optical system and a complementary metal oxide semiconductor (CMOS). In addition, the signal processing circuit includes, for example, an automatic gain control (AGC) circuit and/or an analog to digital converter (ADC), converts an analog signal generated by the imaging element into a digital signal (image data), and processes various signals. An example of signal processing to be performed by the signal processing circuit is a white balance correction process, a color tone correction process, a gamma correction process, a YCbCr conversion process, an edge enhancement process, or the like.

In addition, in a configuration in which a process is performed in a stand-alone manner, the image processing apparatus 100 may not be provided with the communication device 164. In addition, it is possible to configure the image processing apparatus 100 without the operation device 160 or the display device 162.

An example of the configuration of the image processing apparatus 100 will be described with reference back to FIG. 13. The communication unit 102 is a communication means provided in the image processing apparatus 100, and performs wireless/wired communication with the imaging apparatus, the display apparatus, or the external apparatus such as a server via the network (or directly). In addition, communication of the communication unit 102 is controlled, for example, by the control unit 104. Here, although an example of the communication unit 102 is a communication antenna and an RF circuit or a LAN terminal and a transmission/reception circuit, the configuration of the communication unit 102 is not limited to the above. For example, the communication unit 102 can have a configuration corresponding to an arbitrary standard in which communication is possible such as a USB terminal and a transmission/reception circuit or an arbitrary configuration communicable with an external apparatus via the network.

The control unit 104 is constituted, for example, by an MPU, and functions to control the entire image processing apparatus 100. In addition, the control unit 104 includes, for example, the image processing unit 110 and the display control unit 112, and functions to play a leading role in the process related to the image processing method according to this embodiment. More specifically, the control unit 104, for example, controls combining of the captured image and the operation target image so as to generate the combined image for feeding back gesture recognition to the user.

The image processing unit 110 functions to play a leading role in the above-described process (combining process) (1), and changes a degree of visualization of a captured image to be displayed on a display screen based on the captured image or an operation target image, and combines the captured image whose degree of visualization has been changed with the operation target image.

The display control unit 112 functions to play a leading role in the above-described process (display control process) (2), and displays the image combined by the image processing unit 110 on the display screen.

The control unit 104 plays a leading role in the process related to the image processing method according to this embodiment, for example, by including the image processing unit 110 and the display control unit 112.

For example, according to the configuration illustrated in FIG. 13, the image processing apparatus 100 performs the processes (for example, the above-described process (combining process) (1) and the above-described process (display control process) (2)) related to the image processing method according to this embodiment. Therefore, the image processing apparatus 100 can display the captured image and the operation target image on the display screen while preventing visibility of an operation target object from being degraded, for example, according to the configuration illustrated in FIG. 13.

The configuration of the image processing apparatus according to this embodiment is not limited to the configuration illustrated in FIG. 13. For example, the image processing apparatus according to this embodiment can separately include the image processing unit 110 and the display control unit 112 illustrated in FIG. 13 (for example, each is implemented by a separate processing circuit).

In addition, the image processing apparatus according to this embodiment may include, for example, an imaging unit (not illustrated). When the imaging unit (not illustrated) is provided, the image processing apparatus according to this embodiment can process a captured image generated by imaging in the imaging unit (not illustrated).

For example, in a configuration in which a process is performed in a stand-alone manner, the image processing apparatus according to this embodiment may not be provided with the communication unit 102.

As described above, the image processing apparatus according to this embodiment performs, for example, the above-described process (combining process) (1) and the above-described process (display control process) (2), as the process related to the image processing method according to this embodiment. Here, because the image processing apparatus according to this embodiment changes the degree of visualization of the captured image in the above-described process (combining process) (1), it is possible to prevent the visibility of the operation target object from being degraded even when the captured image and the operation target image are merely combined and displayed on the display screen.

Therefore, the image processing apparatus according to this embodiment can display the captured image and the operation target image on the display screen while preventing the visibility of the operation target object from being degraded.

In addition, when the image processing apparatus according to this embodiment determines a partial range in which the captured image is partially visualized based on the operation target object included in the operation target image in the above-described process (combining process) (1), it is possible to display an image in which the operation target object included in the operation target image is more clearly displayed on the display screen. Therefore, in the above-described case, the image processing apparatus according to this embodiment, for example, can further improve the visibility of the operation target object (that is, an operation target object constituting a GUI) included in the operation target image.

In addition, when the image processing apparatus according to this embodiment determines the partial range in which the captured image is partially visualized based on a predetermined target recognized from the captured image in the above-described process (combining process) (1), the image processing apparatus according to this embodiment, for example, can implement an unrealistic mirror-image expression for the user. Therefore, in the above-described case, the image processing apparatus according to this embodiment, for example, can feed back unrealistic gesture recognition to the user.

Further, because the image processing apparatus according to this embodiment changes a degree of visualization of the captured image in the above-described process (combining process) (1), it is possible to control visualization of a region unnecessary for an operation by a gesture even when the captured image and the operation target image are merely combined and displayed on the display screen. Therefore, because the image processing apparatus according to this embodiment, for example, enables the user to more easily perform an operation by a more precise gesture, it is possible to further improve the operability of the user.

Although the image processing apparatus has been described as this embodiment, this embodiment is not limited to this type. This embodiment can be applied to various devices capable of processing an image and controlling a display of the processed image on the display screen. The devices include a communication apparatus such as a portable phone or a smart phone, a video/music reproduction device (or video/music recording/reproduction device), a game device, a computer such as a personal computer (PC) or a server, a display apparatus such as a television receiver, and an imaging apparatus such as a digital camera. In addition, this embodiment, for example, can be embedded in the device as described above, and applied to a processing integrated circuit (IC).

In addition, the process related to the image processing method according to this embodiment may be implemented by an image processing system including a plurality of apparatus on a premise of a connection to a network, for example, such as cloud computing (or communication between apparatus).

Program According to This Embodiment

A program (for example, a program capable of performing the processes related to the image processing method according to this embodiment such as the above-described process (combining process) (1) and the above-described process (display control process) (2)) for causing a computer to function as the image processing apparatus according to this embodiment can display a captured image and an operation target image on a display screen while preventing visibility of an operation target object from being degraded.

Although the preferred embodiments of the present disclosure have been described with reference to the accompanying drawings, a technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

Although an example in which the program (computer program) for causing the computer to function as the image processing apparatus according to this embodiment is provided has been described above, a recording medium recording each program described above can be further provided in this embodiment.

The above-described configuration is an example of this embodiment, and, of course, belongs to the technical scope of the present disclosure.

Additionally, the following configurations are also within the technical scope of the present disclosure.

(1)

An information processing apparatus including:

a processing unit configured to control combining of a captured image and an operation target image so as to generate a combined image for feeding back gesture recognition to a user, wherein a degree of visualization of the captured image appears to be changed in the combined image.

(2)

The information processing apparatus according to (1), wherein the degree of the visualization in part of the captured image appears to be changed in the combined image.

(3)

The information processing apparatus according to (2), wherein the part of the captured image corresponds to a region of the combined image having a position determined according to a position in the operation target image of an operation target object in the combined image.

(4)

The information processing apparatus according to (1), wherein the degree of the visualization of the captured image is changed based on an operation target object included in the operation target image.

(5)

The information processing apparatus according to (4), wherein the degree of the visualization of the captured image includes a decrease in a degree of visualization of a region of the captured image, and wherein the region is determined according to a position of the operation target object within the operation target image.

(6)

The information processing apparatus according to (1), wherein the degree of the visualization of the captured image is changed based on a predetermined target recognized from the captured image.

(7)

The information processing apparatus according to (6), wherein the degree of the visualization of the captured image is changed by at least a size of a part cropped from the captured image.

(8)

The information processing apparatus according to (6), wherein the predetermined target is at least one of a face and a hand.

(9)

The information processing apparatus according to (6), wherein the predetermined target is a web page.

(10)

The information processing apparatus according to (6), wherein changing the degree of the visualization of the captured image includes changing the degree of the visualization of the partial region including the predetermined target in the captured image to the degree of the visualization of the other region in the captured image.

(11)
The information processing apparatus according to (10), wherein changing the degree of the visualization of the captured image includes changing one or more of luminance, saturation, and colors of the partial region and the other region.

(12)
The information processing apparatus according to (10), wherein changing the degree of the visualization of the captured image includes setting one of the partial region and the other region as a monochromatic region and setting the other as a color region.

(13)
The information processing apparatus according to (10), wherein changing the degree of the visualization of the captured image includes changing degrees of blurring of the partial region and the other region.

(14)
The information processing apparatus according to (10), wherein changing the degree of the visualization of the captured image includes displaying only the partial region.

(15)
The information processing apparatus according to (1), wherein the degree of the visualization of the captured image is changed so that the captured image appears to be classified by rank in the combined image.

(16)
The information processing apparatus according to (1), wherein changing the degree of the visualization of the captured image includes changing a degree to which the captured image is transparent.

(17)
The information processing apparatus according to (16), wherein changing the degree to which the captured image is transparent includes dynamically changing the degree to which the captured image is transparent.

(18)
The information processing apparatus according to (17), wherein dynamically changing the degree to which the captured image is transparent includes dynamically changing the degree to which the captured image is transparent based on a spatial frequency of the captured image.

(19)
The information processing apparatus according to (17), wherein dynamically changing the degree to which the captured image is transparent includes dynamically changing the degree to which the captured image is transparent based on a color shade of the captured image.

(20)
The information processing apparatus according to (1), wherein changing the degree of the visualization of the captured image includes cropping the captured image.

(21)
The information processing apparatus according to (20), wherein changing the degree of the visualization of the captured image further includes scaling the cropped image.

(22)
The information processing apparatus according to (1), wherein changing the degree of the visualization of the captured image includes smoothing the captured image.

(23)
The information processing apparatus according to (22), wherein smoothing the captured image includes using an edge-preserving smoothing filter.

(24)
The information processing apparatus according to (1), wherein combining a changed captured image with the operation target image includes changing a display position of the changed captured image with respect to a display position of the operation target image.

(25)
The information processing apparatus according to (1), wherein the captured image includes a face part of the user and another part of the user, and
wherein the face part is excluded from the combined image.

(26)
The information processing apparatus according to (1), wherein the captured image includes an image of a plurality of users, and
wherein changing the degree of the visualization of the captured image includes cropping the captured image so as to generate a region cropped for each of the plurality of recognized users.

(27)
The information processing apparatus according to (1), wherein the processing unit controls a display of the combined image.

(28)
The information processing apparatus according to (1), further including:
a display unit,
wherein the processing unit controls a display of the combined image.

(29)
The information processing apparatus according to (1), further including:
an imaging unit.

(30)
The information processing apparatus according to (1), wherein the operation target image is one of an image representing a web page, an image representing a menu screen, and an image representing an operation screen.

(31)
An information processing method including the step of:
combining a captured image with an operation target image so as to generate a combined image for feeding back gesture recognition to a user,
wherein a degree of visualization of the captured image appears to be changed in the combined image.

(32)
A computer-readable recording medium recording a program for causing a computer to execute a step of:
combining a captured image with an operation target image so as to generate a combined image for feeding back gesture recognition to a user,
wherein a degree of visualization of the captured image appears to be changed in the combined image.

(33)
An image processing apparatus including:
an image processing unit for changing a degree of visualization of a captured image, for feeding back gesture recognition to a user, to be displayed on a display screen, based on the captured image or an operation target image to be operated according to a result of the gesture recognition, and combining the captured image whose degree of visualization has been changed with the operation target image; and
a display control unit for displaying a combined image on the display screen.

(34)
The image processing apparatus according to (33), wherein the image processing unit changes a partial range in which the captured image is partially visualized, as a change in the degree of visualization.

(35)
The image processing apparatus according to (34), wherein the image processing unit determines the partial range based on the operation target object included in the operation target image.

(36)
The image processing apparatus according to (34), wherein the image processing unit determines the partial range based on a predetermined target to be recognized from the captured image.

(37)
The image processing apparatus according to (36), wherein the image processing unit recognizes a face as the predetermined target from the captured image, and determines a portion other than the recognized face as the partial range.

(38)
The image processing apparatus according to (36), wherein the image processing unit recognizes a hand as the predetermined target from the captured image, and determines a region including the recognized hand as the partial range.

(39)
The image processing apparatus according to (36), wherein the image processing unit recognizes a moving body as the predetermined target from the captured image, and determines a region including the recognized moving body as the partial range.

(40)
The image processing apparatus according to (34), wherein the image processing unit recognizes a user from the captured image,
crops a partial region including the recognized user in the captured image from the captured image, and
designates the cropped region as a region of a target for determining the partial range.

(41)
The image processing apparatus according to (40), wherein the image processing unit crops a partial region including a recognized user for each recognized user when a plurality of users have been recognized from the captured image, and
designates each cropped region as a region of a target for determining the partial range corresponding to each recognized user.

(42)
The image processing apparatus according to (34), wherein the image processing unit changes a degree to which the captured image is transparent or an area in which the captured image is displayed, as partial visualization of the captured image.

(43)
The image processing apparatus according to (33), wherein the image processing unit changes a degree of smoothing to which the captured image is smoothed, as a change in the degree of visualization.

(44)
The image processing apparatus according to any of (33) to (43), wherein the image processing unit starts a process when a predetermined target has been recognized from the captured image.

(45)
An image processing method including:
changing a degree of visualization of a captured image, for feeding back gesture recognition to a user, to be displayed on a display screen, based on the captured image or an operation target image to be operated according to a result of the gesture recognition;
combining the captured image whose degree of visualization has been changed with the operation target image; and
displaying a combined image on the display screen.

REFERENCE SIGNS LIST

100 Image processing apparatus
102 Communication unit
104 Control unit
110 Image processing unit
112 Display control unit

The invention claimed is:
1. An information processing apparatus comprising:
a processing circuit configured to (i) control combining of a captured image and an operation target image so as to generate a combined image having a number of degrees of visualization and (ii) cause an image signal representing the combined image to be transmitted for reception by a display so as to enable the combined image to be displayed on a display screen of the display for feeding back gesture recognition to a user,
the operation target image having an operation target object, and
wherein the combined image is generated by applying a first degree of visualization to a first portion of the captured image including a predetermined target recognized in the captured image, in which the first portion is to be displayed at a position on the display screen including the operation target object, and a second degree of visualization to a second portion of the captured image which does not include the first portion, in which the second degree of visualization is obtained by changing a degree of transparency associated with the captured image based on a spatial frequency or hue detected in a background portion of the captured image.

2. The information processing apparatus according to claim 1,
wherein the captured image includes an image of a plurality of users.

3. The information processing apparatus according to claim 1, further comprising the display.

4. The information processing apparatus according to claim 1, further comprising an imaging device configured to obtain the captured image.

5. The information processing apparatus according to claim 1, wherein the operation target image is one of an image representing a web page, an image representing a menu screen, or an image representing an operation screen.

6. The information processing apparatus according to claim 1, in which the operation target object is a button, an icon or a hyperlink.

7. The information processing apparatus according to claim 1, in which the second degree of visualization is obtained by changing a degree of transparency associated with the captured image based on a position of the operation target object.

8. The information processing apparatus according to claim 1, in which the operation target object is more visible than the second portion of the captured image.

9. An information processing method for use with an information processing apparatus, said method comprising:

controlling combining of a captured image and an operation target image so as to generate a combined image having a number of degrees of visualization; and causing an image signal representing the combined image to be transmitted for reception by a display device so as to enable the combined image to be displayed on a display screen of the display device for feeding back gesture recognition to a user, the operation target image having an operation target object, and wherein the combined image is generated by applying a first degree of visualization to a first portion of the captured image including a predetermined target recognized in the captured image, in which the first portion is to be displayed at a position on the display screen including the operation target object, and a second degree of visualization to a second portion of the captured image which does not include the first portion, in which the second degree of visualization is obtained by changing a degree of transparency associated with the captured image based on a spatial frequency or hue detected in a background portion of the captured image.

10. A non-transitory computer-readable recording medium having recorded thereon a program which when executed causes a computer to perform a method comprising:

controlling combining of a captured image and an operation target image so as to generate a combined image having a number of degrees of visualization; and causing an image signal representing the combined image to be transmitted for reception by a display device so as to enable the combined image to be displayed on a display screen of the display device for feeding back gesture recognition to a user, the operation target image having an operation target object, and wherein the combined image is generated by applying a first degree of visualization to a first portion of the captured image including a predetermined target recognized in the captured image, in which the first portion is to be displayed at a position on the display screen including the operation target object, and a second degree of visualization to a second portion of the captured image which does not include the first portion, in which the second degree of visualization is obtained by changing a degree of transparency associated with the captured image based on a spatial frequency or hue detected in a background portion of the captured image.

* * * * *